United States Patent [19]

Kawamura et al.

[11] 4,159,865
[45] Jul. 3, 1979

[54] ZOOM LENS SYSTEM

[75] Inventors: Naoto Kawamura, Inagi; Akira Tajima, Kawasaki, both of Japan

[73] Assignee: Canon Kabushiki Kaisha, Tokyo, Japan

[21] Appl. No.: 906,762

[22] Filed: May 16, 1978

Related U.S. Application Data

[63] Continuation of Ser. No. 715,496, Aug. 18, 1976, abandoned.

[30] Foreign Application Priority Data

Aug. 22, 1975 [JP] Japan .................................. 50-101860

[51] Int. Cl.$^2$ ............................................... G02B 15/14
[52] U.S. Cl. ...................................... 350/184; 350/176; 350/189; 350/206
[58] Field of Search ............... 350/176, 184, 186, 189, 350/206

[56] References Cited

U.S. PATENT DOCUMENTS

| | | | |
|---|---|---|---|
| 3,832,035 | 8/1974 | Takahashi | 350/189 |
| 3,848,969 | 11/1974 | Tajima | 350/184 |
| 3,880,498 | 4/1975 | Liu et al. | 350/184 |

*Primary Examiner*—Paul A. Sacher
*Attorney, Agent, or Firm*—Toren, McGeady and Stanger

[57] ABSTRACT

A zoom lens system comprising from front to rear a first lens group of negative power and a second lens group of positive power with the axial separation therebetween being variable for zooming purposes. The first lens group is provided with a non-spherical surface to achieve minimization of the overall dimensions of the complete system without causing any decrease in the extent to which the corrections of various aberrations are maintained throughout the zooming range irrespective of a great increase in the photographable range extended toward the wide angle side.

5 Claims, 25 Drawing Figures

FIG.6
(a) WIDE ANGLE END
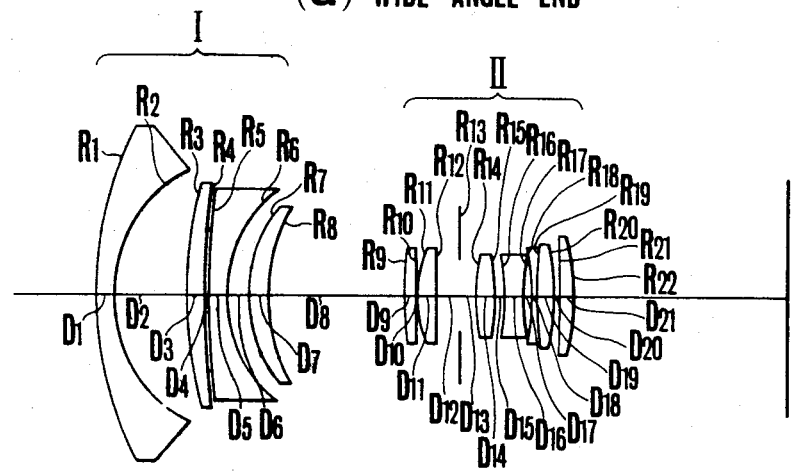
(b) MIDDLE
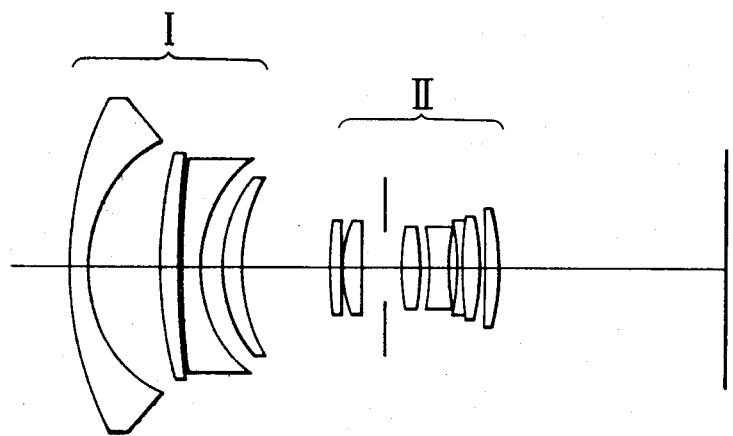
(c) TELEPHOTO END
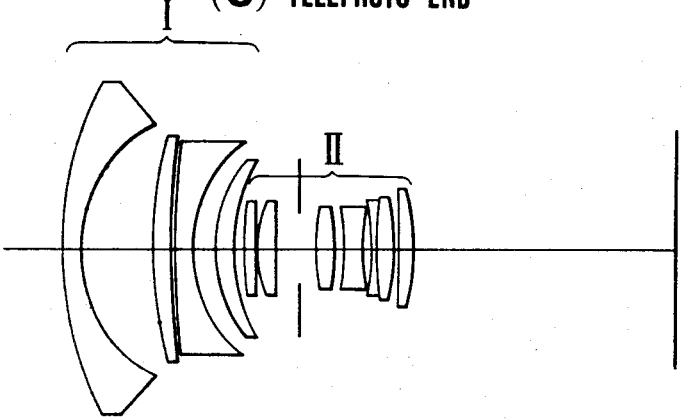

FIG.8
(a) WIDE ANGLE END
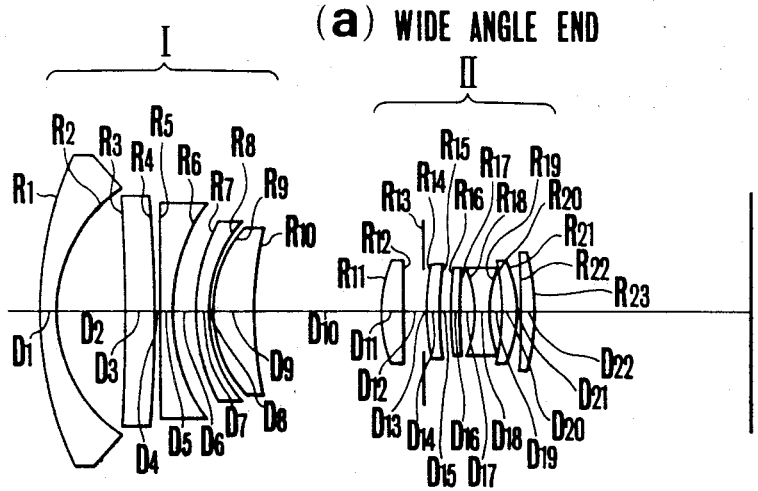
(b) MIDDLE
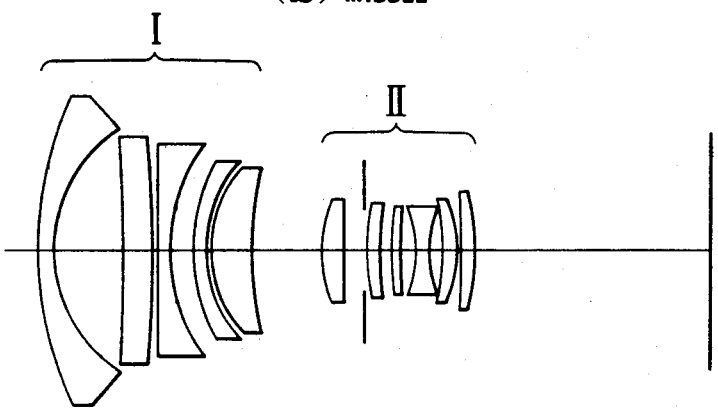
(c) TELEPHOTO END
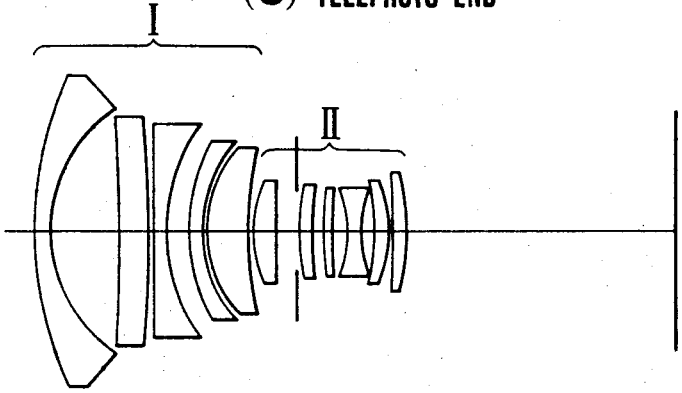

F I G.10 (a) WIDE ANGLE END
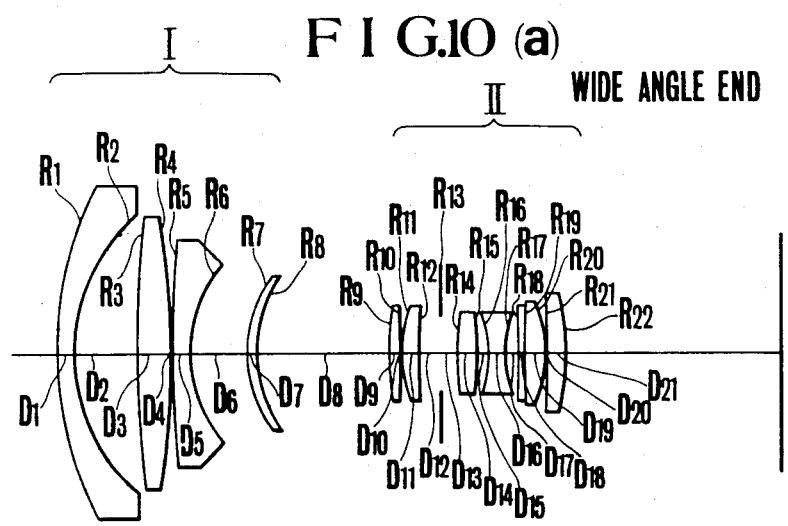
(b) MIDDLE
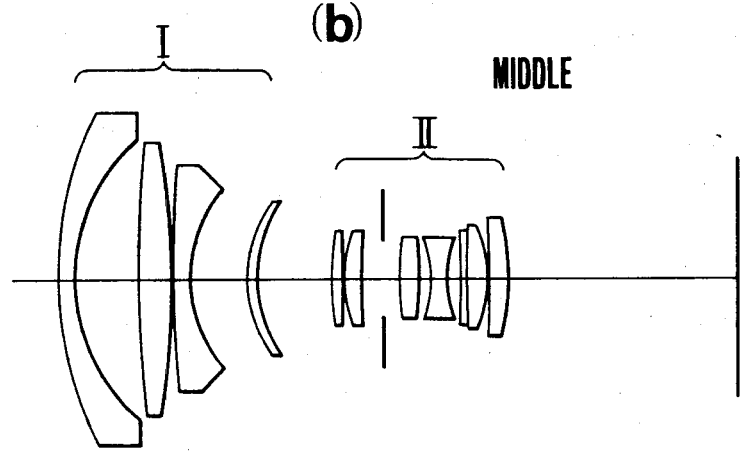
(c) TELEPHOTO END
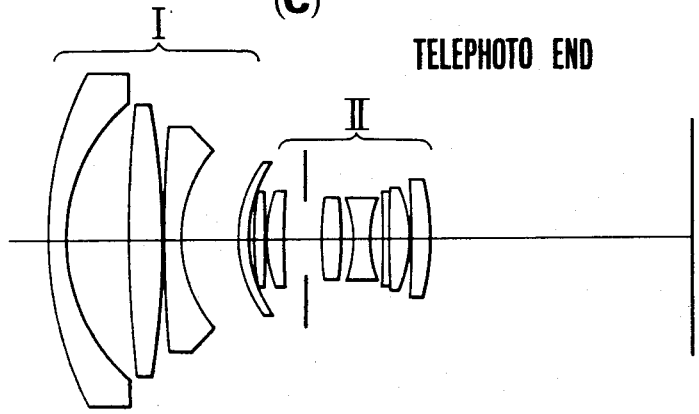

FIG.12 (a) WIDE ANGLE END
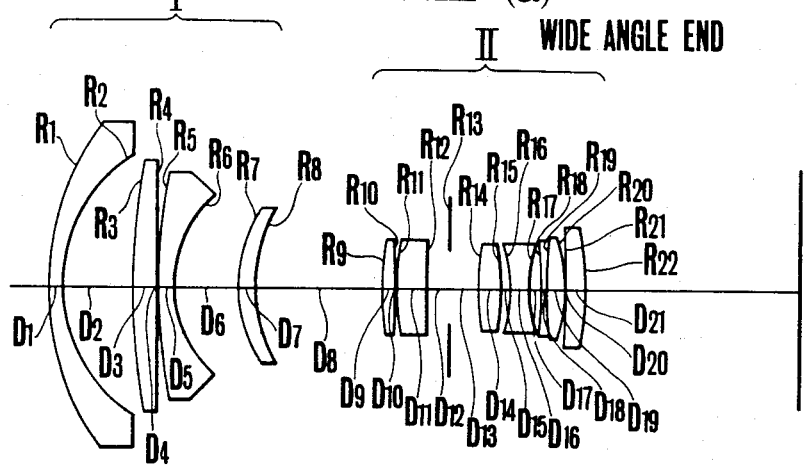
(b) MIDDLE
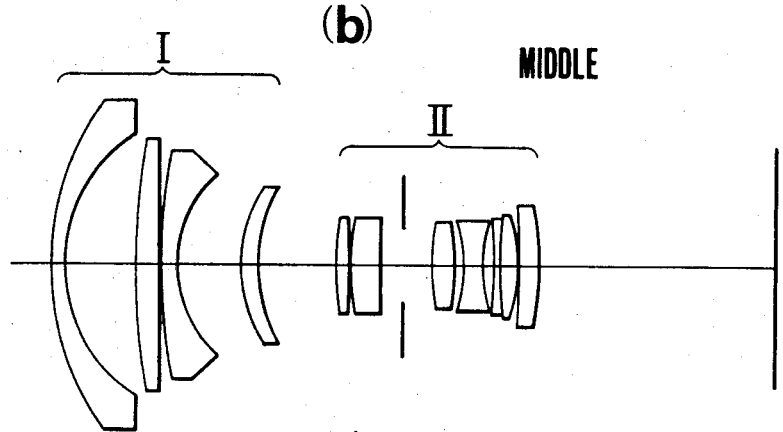
(c) TELEPHOTO END
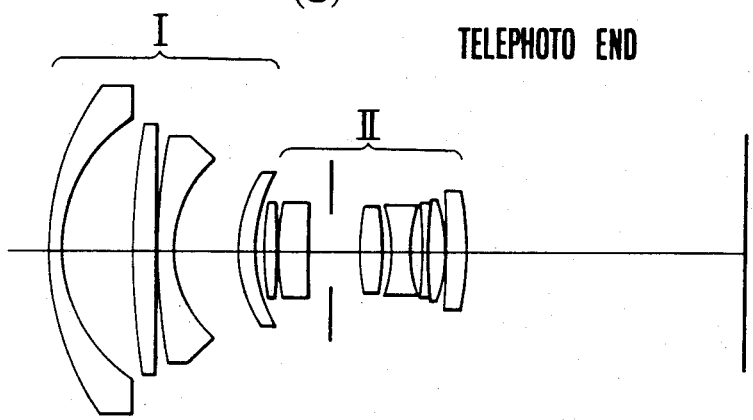

ZOOM LENS SYSTEM

This is a continuation of application Ser. No. 715,496, filed Aug. 18, 1976 and now abandoned.

BACKGROUND OF THE INVENTION

This invention relates to zoom lens systems of the type comprising a front lens group having a negative focal length and a rear lens group having a positive focal length with the axial separation therebetween being variable for zooming purposes, and more particularly to an improvement of a zoom lens system of the type described in that, with a greatly increased image angle up to about 84°, it is possible to achieve minimization of the overall dimensions of the complete system without causing any decrease in the extent to which the corrections of various aberrations are maintained throughout the zooming range irrespective of the great increase in the photographable range extended toward the wide angle side.

As shown in FIG. 1, a zoom system which may be conveniently considered as comprising a negative front lens I and a positive rear lens II, both of which are moved axially but in differential relation to each other to effect variation of the focal length of the overall lens system is, because of its being of inverted telephoto type, advantageous in providing an increased extent of image angle.

It is known to provide such type zoom lens as disclosed, for example, in U.S. Pat. Nos. 3,143,590 and 3,848,969. As the maximum axial separation between the front and rear lenses I and II occurs at the wide angle setting for the maximum image angle, however, there is a disadvantage to this zoom system such that an increase in the diameter of the front lens I must be made for the extended range of image angles toward the maximum. This problem becomes serious in designing a zoom lens to increase the image angle thereof to a great extent. If the provision for increasing the maximum image angle is forced to be compatible with severe limitation of the overall dimensions of the zoom lens to a minimum, the barrel type distortion in the wide angle position is rapidly increased and its satisfactory correction is made difficult by any means.

SUMMARY OF THE INVENTION

Accordingly, the present invention has for the general object to provide a zoom lens system of the above type which has overcome the above mentioned drawbacks of the known constructions.

It is a primary object of the present invention to provide a zoom lens system of the above type which, while increasing the useful image angle at the same time reduces not only distortion at the wide angle region but also other various aberrations which would be otherwise affected by this distortional correction action in the intermediate zooming region and particularly spherical aberration at the telephoto region, while still permitting reduction in the diameters of the front lens members of the complete system as well as in the physical length along the optical axis.

It has been found, in accordance with the present invention, that the aforedescribed object can be realized by modifying one of the refracting surfaces in the diverging first lens group into a non-spherical surface with specified figuring constants and by fulfilling specific requirements which will be described in detail later. With this modification, it becomes possible to design the zoom lens system of the above type to increase its image angle to as large as reaching 84° with limitation of the overall dimensions of the complete system to a minimum while still achieving a high standard of correction of various aberrations throughout the entire zooming range and throughout the increased image angle.

The zoom lens system of the present invention is, because of its capability of maintaining a constant image plane in a mechanically compensated manner while its focal length varies throughout a range of axial movement of the front and rear lens groups of the system, particularly suited for use with a still camera or as a super-wide angle zoom lens objective for a cinematographic camera or a television camera.

BRIEF DESCRIPTION OF THE DRAWINGS

FIG. 6 is a block diagram of a second embodiment of a zoom lens according to the present invention with FIG. 6A showing a wide angle setting, FIG. 6B showing an intermediate, and FIG. 6C showing a telephoto setting.

FIG. 8 is a block diagram of a third embodiment of a zoom lens according to the present invention with FIG. 8A showing a wide angle setting, FIG. 8B showing an intermediate setting, and FIG. 8C showing a telephoto setting.

FIG. 10 is a block diagram of a fourth embodiment of a zoom lens according to the present invention with FIG. 10A showing a wide angle setting, FIG. 10B showing an intermediate setting, and FIG. 10C showing a telephoto setting.

FIG. 12 is a block diagram of a fifth embodiment of a zoom lens according to the present invention with FIG. 12A showing a wide angle setting, FIG. 12B showing an intermediate setting, and FIG. 12C showing a telephoto setting.

DETAILED DESCRIPTION OF THE PREFERRED EMBODIMENTS

Figure 1:
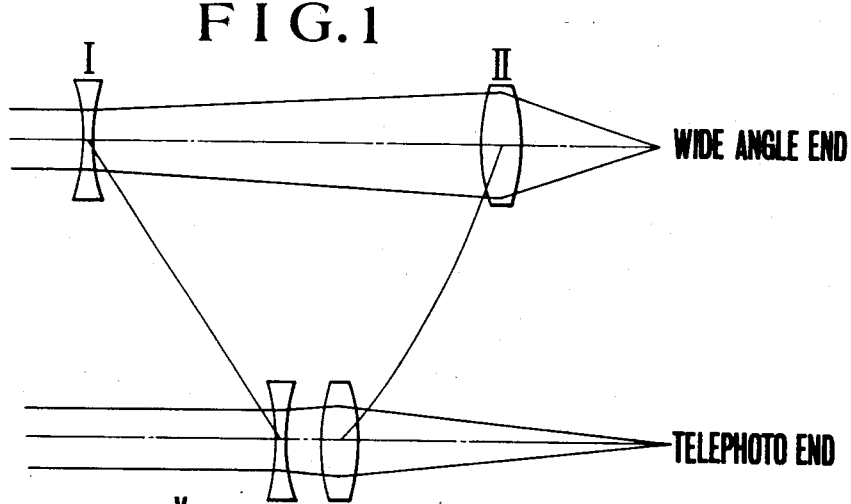
FIG. 1 is a block diagram of a two-component zoom lens system comprising negative front and positive rear lenses in two different operating positions.

Referring to FIGS. 4, 6, 8, 10 and 12 there are shown five preferred practical embodiments of a zoom lens system of the above type according to the present invention each comprising, from front to rear in the direction in which light enters the system from the object side, a first lens component I of negative focal length and having a non-spherical surface formed at $R_1$ and a second lens component II of positive focal length and carrying a diaphragm positioned in an air spaced therein, whereby the axial separation between the first and second components I and II is varied to effect variation of the focal length of the overall lens system. The first component I is provided with a positive lens element situated at the rearmost position thereof and which is designed to assist in the simultaneous achievement of the specified range of variation of the focal length and the excellent state of correction of the image aberrations throughout the zoom range. In other words, the positive lens element is designed to shift the rear principal plane of first component I so far back that it is possible to establish the closest positioning of first and second components I and II at telephoto settings without contact therebetween, and further that the spherical aberration due to the diverging lens elements constituting part of component I which is of diverging characteristics can be reduced in the telephoto positions, and the astigmatism resulting from the introduction of the non-spherical surface into component I can be sufficiently reduced in the wide angle positions. Though the otherwise resulting spherical aberration as over-corrected in the telephoto positions can be compensated to some extent by a suitable design of second component II, it is more preferable from the point of view of maintaining good stability of aberration correction throughout the entire zooming range to minimize the residual spherical aberration of first component I.

Second component II which is of converging characteristics is constructed with a double concave lens element bracketed by two converging groups of lens elements. With this construction and arrangement, it is possible to obtain further assistance in the simultaneous achievement of the stabilization of the aberrations during zooming and the derivation of a suitable lens arrangement for zooming purposes. In other words, the double concave lens element is so designed that, of the various aberrations, the spherical aberration which is susceptible to large variation in the telephoto positions and the astigmatism which is increased to a very large extent in the wide angle positions because of the non-spherical surface introduced in the first component I can be well compensated for, and further that the front principal plane of second component II is as far ahead as possible in order to insure that, even at increased zoom ratios, first and second components I and II may be separated from each other by a sufficiently large air space when zoomed to the telephoto settings where the air space is at minimum. In the zoom lens of the invention, second component II includes three positive lens elements consecutively arranged from the front to assist in good correction for spherical aberration in the telephoto positions. It has been found that the minimum necessary number of positive lens elements as such is three.

While the zoom lens of the invention is specified with respect to the preferable location of the non-spherical surface in first component I based on the following specific requirements, it is advantageous in the general embodiment of the invention to select the frontmost lens element in first component I for introduction of a non-spherical surface thereto.

The zoom lens of the invention, in addition to fulfilling the above general requirement that one of the lens surfaces in component I be non-spherical, fulfills the following specific requirements:

$$-3.0 < \frac{f_1}{f_W} < -1.17 \tag{1}$$

$$0.54 < \frac{l_W}{f_W} < 1.5 \tag{2}$$

$$0.35 < \frac{\bar{h}_{Ti}}{\bar{h}_{Wi}} < 0.8 \tag{3}$$

$$0.7 < \frac{h_{Wi}}{\bar{h}_{Wi}} < 2.0 \tag{4}$$

$$0 < \phi i < 0.3 \tag{5}$$

wherein $f_1$: the focal length of the first lens component;

$f_W$: the minimum focal length of the overall lens system;

$W$: the axial air separation between the first and second lens components in the minimum focal length (wide angle) positions;

$h_{Wi}$: the height of the point of incidence of a paraxial ray on the i-th surface (aspheric) from the optical axis when the lens system is in the wide angle setting with an infinitely distant object;

$\bar{h}_{Wi}$: the height of the point of incidence of a paraxial pupil ray on the i-th surface (aspheric) from the optical axis when the lens system is in the wide angle setting with an infinitely distant object.

$\bar{h}_{Ti}$: the height of the point of incidence of a paraxial pupil ray on the i-th surface (aspheric) from the optical axis when the lens system is in the telephoto setting with an infinitely distant object.

In connection with the above inequalities, it is to be noted that the upper and lower limit values of the ranges of the above-defined quantities are determined based on the paraxial ray-tracing method by taking into account the initial values as set forth below:

$$a_{W1} = 0 \, ; \, a_{T1} = 0 \, ; \, \bar{a}_{W1} = -1.0 \, ; \, \bar{a}_{T1} = -\frac{1}{f_T}$$

$$h_{W1} = 1.0 \, ; \, h_{T1} = f_T \, ; \, \bar{h}_{W1} = -t_W \, ; \, \bar{h}_{T1} = -\frac{t_T}{f_T}$$

wherein $\alpha$ is the angle of inclination of the ray with respect to the optical axis; W-subscript and T-subscript indicate the wide angle and telephoto positions respectively; $t_W$ is the axial distance between the first lens surface and the entrance pupil in the wide angle position; $t_T$ is the axial distance between the first lens surface and the entrance pupil in the telephoto position; and $f_T$ is the maximum focal length of the overall lens system.

Conditions (1) and (2) concern a power distribution of the lens system. When the upper limit of condition (1) is violated, it is made more difficult to achieve satisfactory correction for distortion as well as for other various aberrations. When the lower limit is violated, the size of the complete lens system is increased to contradict the above mentioned object of the invention which is to provide a compact zoom lens, though the aberration correction can be made more easily. The upper limit of condition (2) is also for limitation of the overall dimensions of the lens system to a minimum, while the lower limit of condition (2) is determined to secure a sufficient amount of axial movement of the zoom control lens groups, thereby it is avoided for the zoom ratio to be unduly decreased.

Figure 2:
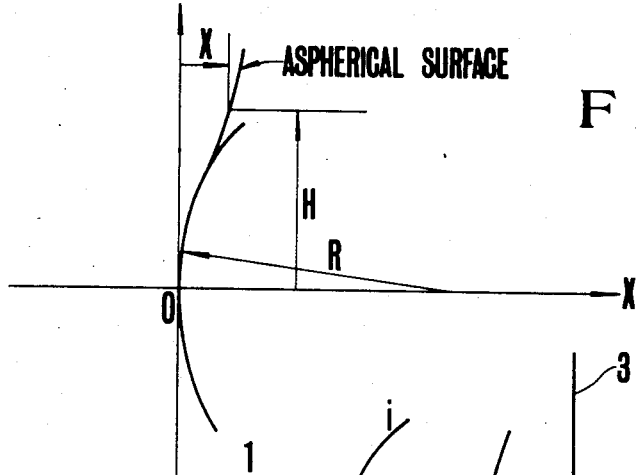
FIG. 2 is a diagram of geometry considered in figuring a non-spherical surface.

Conditions (3) to (5) concern the figuring constants for the non-spherical surfaces. These quantities will be explained in detail below. The figuring of a non-spherical surface is generally expressed by use of co-ordinates X and Y, as shown in FIG. 2, where the abscissa X is parallel to the optical axis, and the ordinate is perpendicular to the optical axis, with the original point being coincident with the vertex of the non-spherical surface. Hence, the amount of deviation X of the non-spherical surface curve from the ordinate at the hight H of a point of the non-spherical surface from the optical axis may be expressed as:

$$X = \frac{(\frac{1}{R} \times H^2)}{1 + \sqrt{1 - (\frac{H}{R})^2}} + BH^4 + CH^6 + DH^8 + \ldots \quad (11)$$

wherein R is the radius of curvature of a paraxial part of the non-spherical surface at its vertex, and B, C and D are figuring constants. The first term on the right side of this equation (11) contains only one parameter R, namely, the radius of curvature of the paraxial part of the non-spherical surface. The second term contains a figuring constant B relates to the 3rd-order aspheric coefficient $\psi$ as follows:

$$\psi = 8(N' - N)B \quad (12)$$

wherein N is the refractive index of the medium containing the incident ray, and N' that of the medium containing the refracted ray.

The third term also contains a figuring constant C related to the 5th-order aspheric coefficient $\Omega$ as follows:

$$\Omega = 48(N' - N)C \quad (13)$$

Figure 3:
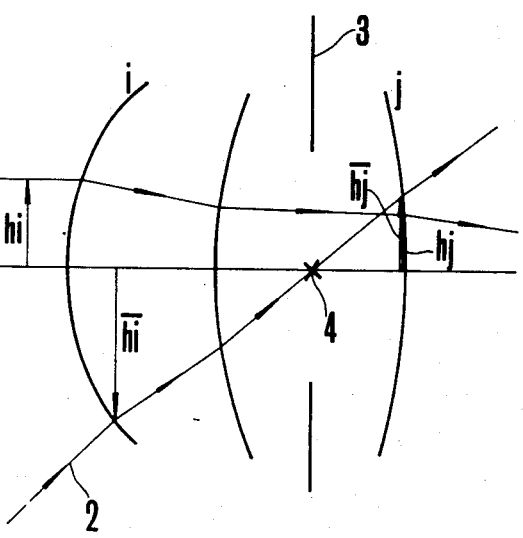
FIG. 3 is a diagram of geometry considered in calculating the amounts of variation of various aberrations due to the introduction of the non-spherical surface by tracing paraxial and oblique rays.

Now assuming that a non-spherical surface in question is formed by modifying a spherical surface having a curvature of value R, the corresponding amounts of variation of 3rd-order aberration coefficients, namely, spherical aberration coefficient (I), coma aberration coefficient (II), astigmatism aberration coefficient (III), sagittal curvature of field aberration coefficient (IV) and distortion coefficient (V) are functions of aspheric coefficient $\psi$ as follows:

$$\begin{aligned}
\Delta I &= h^4 \psi \\
\Delta II &= h^3 \bar{h} \psi \\
\Delta III &= h^2 \bar{h}^2 \psi \\
\Delta IV &= h^2 \bar{h}^2 \psi \\
\Delta V &= h \bar{h}^3 \psi
\end{aligned} \quad (14)$$

wherein h and $\bar{h}$ are the quantities selected for tracing rays with regard to the location and the aperture of the diaphragm one of the rays, namely, the ray 1, as shown in FIG. 3, goes along the optical axis and cuts the individual refracting surfaces (i, j) at respective heights, hi and hj, to intersect the optical axis at the image focus, while the other ray, namely, ray 2 enters the system under an angle of obliquity and passes at the centre 4 of the aperture of the diaphragm 3, the points of incidence of ray 2 on the individual surfaces (i, j) being at heights, $\bar{h}i$ and $\bar{h}j$.

From formulas (14), it is to be understood that as the heights h and $\bar{h}$ for a particular surface are varied during zooming, the introduction of a non-spherical surface of certain coefficient, $\psi$, causes all the 3rd-order aberration coefficients to be varied with zooming to respective extents which are different with different aberration.

Condition (3) is, therefore, to determine the appropriate location of the non-spherical surface in the first lens component. When that of the surfaces which fulfills condition (3) is selected for modification to the non-spherical surface, the aberrational correction action is made effective mainly for barrel type distortion which is most seriously affected in the wide angle positions by such modification with the resulting minimization of the size of the lens system, while preventing the various aberrations from being not so much influenced by the modification, whereby assistance in the stabilization of the aberrations with zooming can be obtained. When the upper limit of condition (3) is violated, the non-spherical surface which at the wide angle positions contributes toward good correction for distortion may at the telephoto positions contribute to strong deterioration of the aberrations. As a result, the aberrations are varied with zooming to so large extent that good correction for the aberrations is made difficult to perform. On the other hand, when the lower limit is violated, the diameters of the front group of elements in first lens component I are increased to so large extent that it is impossible to design the zoom lens of compact structure.

Condition (4) is to make most effective the function of the non-spherical surface in the wide angle positions. The introduction of the non-spherical surface for the primary purpose of correcting barrel type distortion which becomes objectionable at the wide angle positions at the same time influences the 3rd-order aberration coefficients I to V in such a manner as shown by formulas (14) with respect to the common factor of the aspheric coefficient, $\psi$. So long as the aspheric coefficient, $\psi$, is not zero, good correction for distortion does not lead to simultaneous good correction for other aberrations. Condition (4) is to facilitate the solution of this aberrational problem, whereby variation of the astigmatism (or field curvature), $\Delta III$ ($\Delta IV$) which is relatively sensitive to variation of distortion $\Delta V$ during zooming is at least minimized as can be seen from formulas (14) namely, $\Delta V = h\bar{h}^3\psi$, and $\Delta III = h^2\bar{h}^2\psi$. In other words, by increasing the value, $\bar{h}$, as compared with the value, h, that is, increasing the value $|\bar{h}/h|$, it is made possible to decrease variation of astigmatism $\Delta III$ as compared with variation of distortion $\Delta V$. It is apparent from formulas (14) that variations of coma and spherical aberration, namely, $\Delta II = h^3\bar{h}\psi$ and $\Delta I = h^4\psi$, can be automatically decreased by fulfilling condition (4). When the lower limit of condition (4) is violated, the non-spherical surface contributes more largely toward the control of other aberrations than distortion. Particularly the astigmatism is largely increased so that it is difficult to compensate for this astigmatism by any design of the other spherical lens surfaces than the non-spherical surface. In this case, it is required to increase the aspheric coefficient to effect satisfactory correction for distortion, that is, to increase the amount of deviation from the spherical surface with the resulting increase in the difficulty of manufacturing the non-spherical lens elements within the specified tolerances. On the other hand, when the upper limit of condition (4) is violated, the physical size of the lens system is increased to sacrifice the compactness. Therefore, it is desirable to increase $|\bar{h}/h|$ to as high a level as possible with limitation of the dimensions of the overall lens system to a minimum.

Condition (5) concerns the figuring of the non-spherical surface for reducing the barrel type distortion. In general, a zoom lens of the type comprising a negative front and a positive rear lens component with the diaphragm being located within the rear lens component tends to produce under-corrected distortion, namely, barrel type distortion so that the distortion coefficient becomes a positive large quantity. In order to correct this by employing a non-spherical surface, it is required that variation of distortion defined as $\Delta V = hh^3\psi$ be negative. Since $h > 0$; and $\bar{h} < 0$, then $\psi > 0$. When the upper limit of condition (5) is violated, other aberrations than distortion are deteriorated to so large extent that these aberrations can not be compensated for by any design of the spherical surfaces other than the non-spherical surface. In particular, the astigmatism is largely varied with respect to the image angle and also increased in quantity. By fulfilling condition (5) it is possible to achieve good correction for the various aberrations.

The first to fifth embodiments of a zoom lens according to the present invention are illustrated diagrammatically by way of practical example in the accompanying drawings. Numerical date for these examples are given successively below in which R designates the radii of curvature of the individual surfaces of the zoom lens with respective subscripts numbered from front to rear, the negative sign indicating that the surface is concave to the front, D designates the axial separations between the successive lens surfaces, N designates the refractive indices of the individual lens elements; and $\nu$ designates the Abbe numbers of the individual lens elements.

Figure 4A:
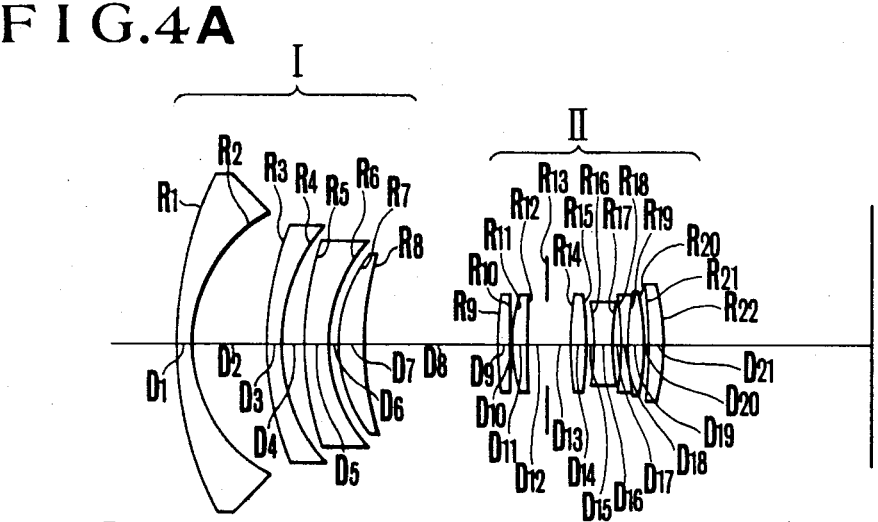
FIG. 4 is a block diagram of a first embodiment of a zoom lens according to the present invention with FIG. 4A showing a wide angle setting, FIG. 4B showing an intermediate setting, and FIG. 4C showing a telephoto setting.
Figure 4B:
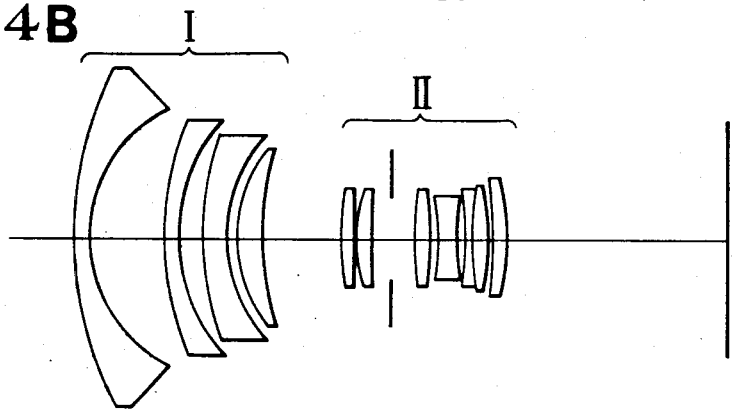
Figure 4C:
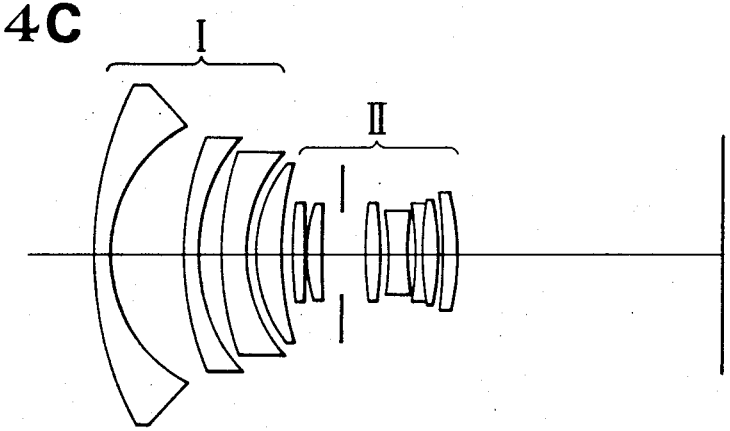
Figure 5A:
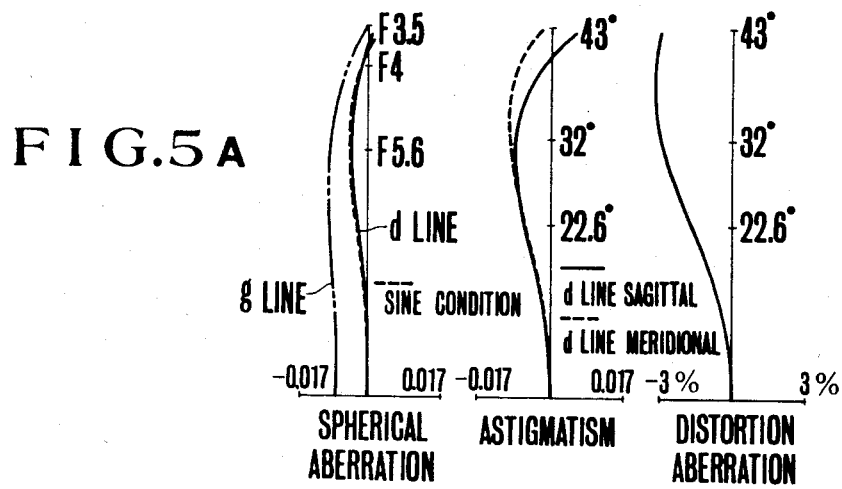
FIGS. 5A, 5B and 5C are graphic representations showing various aberrations of FIG. 4 embodiment when set in the wide angle, intermediate and telephoto positions respectively.
Figure 5B:
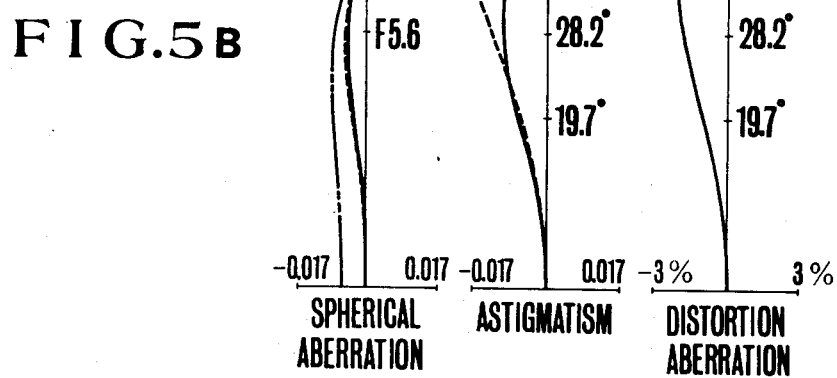
Figure 5C:
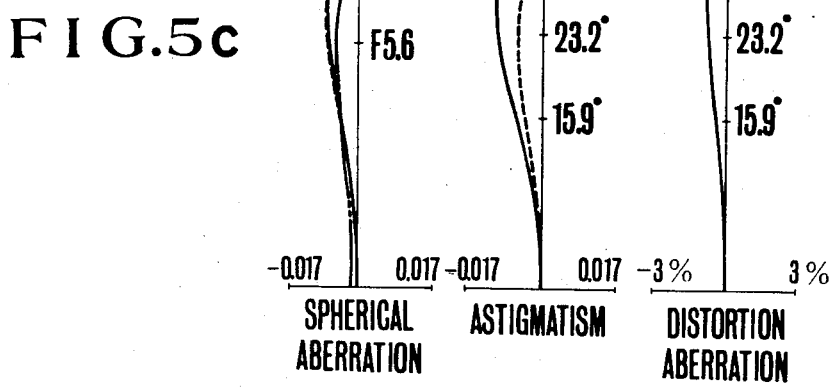

FIG. 4 shows the first embodiment of a zoom lens according to the present invention with FIG. 4A showing a wide angle setting, FIG. 4B showing an intermediate setting and FIG. 4C showing a telephoto setting. This zoom lens comprises a first lens component of negative refractivity consisting of the lens elements with the surfaces $R_1$ to $R_8$ and a second lens component of positive refractivity consisting of the lens elements with surfaces $R_9$ to $R_{22}$ except for $R_{13}$ which designates an aperture of the diaphragm of the zoom lens located in an air space between surfaces $R_{12}$ and $R_{14}$. The first surface $R_1$ is aspherical. The air space $D_8$ defined between surfaces $R_8$ and $R_9$ is varied for zooming purposes. FIGS. 5A, 5B and 5C show aberrations of the lens states shown in FIGS. 4A, 4B and 4C respectively.

EMBODIMENT I
$f = 1.0 \sim 1.4774$, $\omega$ image angle = $43° \sim 31.7°$, F-NO 3.5

| surface | No. | R | D | N | $\nu$ |
|---|---|---|---|---|---|
| First component | 1 | 3.62737 (Aspheric) | 0.08333 | 1.62299 | 58.2 |
| | 2 | 1.04256 | 0.51881 | | |
| | 3 | 1.93277 | 0.12740 | 1.58267 | 46.4 |
| | 4 | 1.28198 | 0.17065 | | |
| | 5 | 2.19293 | 0.12794 | 1.62299 | 58.2 |
| | 6 | 0.92838 | 0.09632 | | |
| | 7 | 0.96092 | 0.17802 | 1.72000 | 42.1 |
| | 8 | 2.14754 | Variable | | |
| Second component | 9 | 2.25698 | 0.08093 | 1.63930 | 44.9 |
| | 10 | 16.56349 | 0.0125 | | |
| | 11 | 1.30828 | 0.11431 | 1.60311 | 60.7 |
| | 12 | 4.82481 | 0.13649 | | |
| | 13 | Aperture | 0.17346 | | |
| | 14 | 2.49549 | 0.10860 | 1.62299 | 58.2 |
| | 15 | −2.24538 | 0.075 | | |
| | 16 | −0.88319 | 0.11667 | 1.62004 | 36.3 |
| | 17 | 1.53172 | 0.0625 | | |
| | 18 | −2.54252 | 0.04167 | 1.80518 | 25.4 |
| | 19 | 2.38707 | 0.12500 | 1.72000 | 43.7 |
| | 20 | −0.94478 | 0.00833 | | |
| | 21 | −6.06387 | 0.10417 | 1.7725 | 49.7 |
| | 22 | −1.61488 | | | |

Lens Separation during Zooming with object at infinity

| f | 1.0 | 1.1667 | 1.4774 |
|---|---|---|---|
| $D_8$ | 0.8868 | 0.5009 | 0.04167 |

Figuring constants for aspheric surface R1:

$B_1 = 2.932 \times 10^{-2}$ $C_1 = 1.010 \times 10^{-3}$ $D_1 = 6.3508 \times 10^{-5}$ $E_1 = 4.2858 \times 10^{-4}$ Values of conditions (1) to (5)

$$\frac{f_1}{f_W} = -1.875 \tag{1}$$

$$\frac{l_W}{f_W} = 0.8868 \tag{2}$$

$$\left|\frac{\bar{h}_{T1}}{\bar{h}_{W1}}\right| = \frac{-0.630335}{-1.17959} = 0.5344 \tag{3}$$

$$\left|\frac{\bar{h}_{W1}}{h_{W1}}\right| = \frac{-1.17959}{+1} = 1.1796 \tag{4}$$

$$\psi_1 = 0.1461 \tag{5}$$

| Surface No. | | Ray Tracing in Wide Angle Position | | | |
|---|---|---|---|---|---|
| | | $\alpha$ | h | $\bar{\alpha}$ | $\bar{h}$ |
| First component | 1 | 0.000000 | 1.000000 | −1.000000 | −1.179592 |
| | 2 | 0.173123 | 0.991181 | −1.206215 | −1.118253 |
| | 3 | −0.423910 | 1.209361 | −0.530641 | −0.845141 |
| | 4 | −0.056404 | 1.213865 | −0.787466 | −0.782258 |
| | 5 | −0.612537 | 1.317564 | −0.429074 | −0.709618 |
| | 6 | −0.235231 | 1.335961 | −0.632285 | −0.660170 |
| | 7 | −1.138911 | 1.444790 | −0.185728 | −0.642423 |
| | 8 | −0.047679 | 1.449686 | −0.670942 | −0.573533 |
| Second Component | 9 | −0.536920 | 1.928539 | −0.477385 | −0.147776 |
| | 10 | 0.013725 | 1.927867 | −0.519579 | −0.122328 |
| | 11 | −0.61281 | 1.928627 | −0.514820 | −0.115944 |
| | 12 | 0.834931 | 1.869563 | −0.568697 | −0.075714 |
| | 13 | 0.599359 | 1.788406 | −0.559157 | −0.000000 |
| | 14 | 0.599359 | 1.685268 | −0.559157 | 0.096220 |
| | 15 | 1.023452 | 1.617332 | −0.534944 | 0.131729 |
| | 16 | 1.475784 | 1.507527 | −0.498102 | 0.168790 |
| | 17 | 0.408949 | 1.478310 | −0.617550 | 0.212910 |
| | 18 | −0.194268 | 1.490356 | −0.704427 | 0.256587 |
| | 19 | −0.670025 | 1.505698 | −0.786335 | 0.274592 |
| | 20 | −0.724185 | 1.557910 | −0.796213 | 0.331997 |
| | 21 | 0.472588 | 1.554003 | −0.541175 | 0.336471 |
| | 22 | 0.273030 | 1.554003 | −0.584383 | 0.336471 |
| | | 1.000000 | | −0.426980 | |

| Surface No. | | Ray Tracing in Telephoto Position | | | |
|---|---|---|---|---|---|
| | | $\alpha$ | h | $\bar{\alpha}$ | $\bar{h}$ |
| First Component | 1 | 0.000000 | 1.477433 | −0.676849 | −0.630335 |
| | 2 | 0.255778 | 1.464405 | −0.785975 | −0.590300 |
| | 3 | −0.626299 | 1.786750 | −0.430411 | −0.368774 |
| | 4 | −0.083334 | 1.793405 | −0.542478 | −0.325455 |
| | 5 | −0.904983 | 1.946614 | −0.393368 | −0.258860 |
| | 6 | −0.347538 | 1.973793 | −0.467497 | −0.222299 |
| | 7 | −1.682665 | 2.134581 | −0.317128 | −0.191996 |
| | 8 | −0.070443 | 2.141814 | −0.462140 | −0.144545 |
| Second component | 9 | −0.793264 | 2.173649 | −0.413359 | −0.127957 |
| | 10 | −0.172633 | 2.182104 | −0.449893 | −0.105922 |
| | 11 | −0.257531 | 2.185298 | −0.445772 | −0.100394 |
| | 12 | 0.757953 | 2.131680 | −0.492424 | −0.065559 |
| | 13 | 0.489353 | 2.065418 | −0.484164 | −0.000000 |
| | 14 | 0.489353 | 1.981210 | −0.484164 | 0.083315 |
| | 15 | 0.987919 | 1.915632 | −0.463198 | 0.114062 |
| | 16 | 1.523680 | 1.802264 | −0.431297 | 0.146152 |
| | 17 | 0.248268 | 1.784527 | −0.534725 | 0.184354 |
| | 18 | −0.479900 | 1.814282 | −0.609950 | 0.222173 |
| | 19 | −1.059062 | 1.838533 | −0.680873 | 0.237764 |
| | 20 | −1.125194 | 1.919656 | −0.689425 | 0.287470 |
| | 21 | 0.349469 | 1.916767 | −0.468593 | 0.291344 |
| | 22 | 0.103328 | 1.916767 | −0.506006 | 0.291344 |
| | | 1.000000 | | −0.369714 | |

In the above tables for the ray tracing, $\alpha$ and $\bar{\alpha}$ designate the values of the tangents of angles of inclination of paraxial and paraxial pupil rays respectively with respect to the optical axis of the zoom lens, the angle of inclination being the positive quantity when a clockwise turn will bring a ruler from the direction of the optical axis into that of the ray and being the negative quantity when the turn is counter-clockwise; and h and $\bar{h}$ designate the quantities diagrammatically shown in FIG. 3 and having no sign when the point of incidence falls in the portion of the area which is above the optical axis as viewed in FIG. 3 and having the negative sign when it falls in the opposite area portion. The aforesaid initial values apply to these tables and the following tables shown in Embodiments II to V hereinafter described.

| | Seidel Aberration coefficient | | |
|---|---|---|---|
| | Wide Angle Position $f = 1.0$ | Intermediate Position $f = 1.1667$ | Telephoto Position $f = 1.4774$ |
| L | 0.006283 | 0.004537 | −0.000779 |
| T | 0.000908 | 0.000472 | −0.000438 |
| I | 1.19712 | 1.36879 | 1.63583 |
| II | −0.03259 | −0.03803 | −0.08749 |
| III | 0.02687 | 0.02728 | 0.02565 |
| P | 0.09070 | 0.09070 | 0.09070 |
| V | 0.21930 | 0.13874 | 0.05242 |
| I* | −227.00904 | −274.14741 | −287.56387 |
| II* | −25.49871 | −27.52621 | −11.22614 |
| $I_F$ | −1.54211 | −1.91743 | −0.00400 |
| $II_P$ | 0.53520 | 0.51273 | 0.45421 |
| $\bar{I}$ | −7.40910 | −8.64218 | −9.20373 |
| $\bar{II}$ | 0.27802 | 0.02480 | −0.36702 |
| $\bar{III}$ | 0.07906 | 0.06639 | −0.01767 |

-continued

Figure 7A:
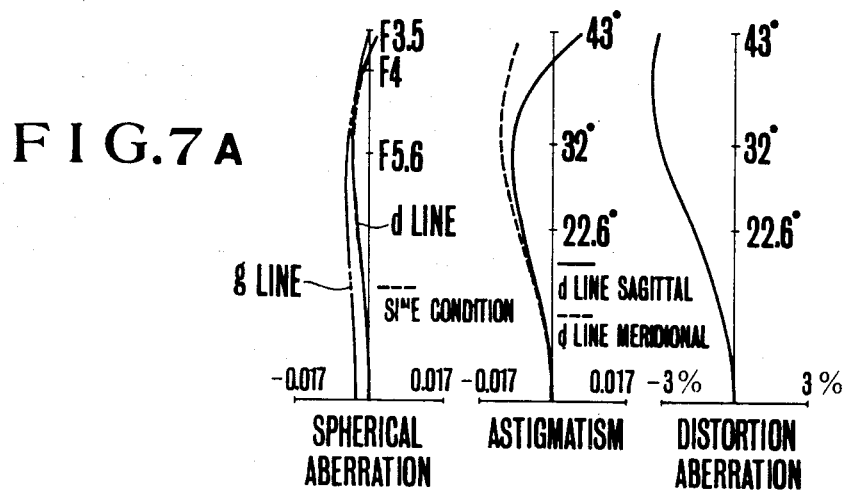
FIGS. 7A, 7B and 7C are graphic representations showing various aberrations of FIG. 5 embodiment when set in the wide angle, intermediate and telephoto positions respectively.
Figure 7B:
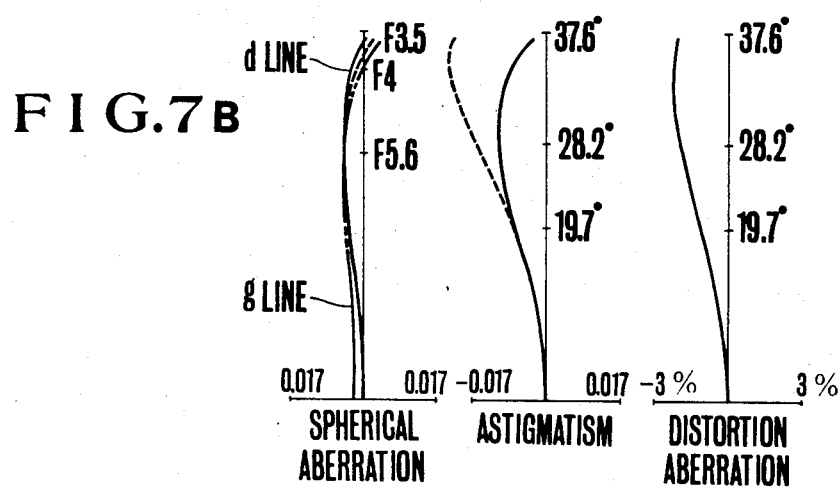
Figure 7C:
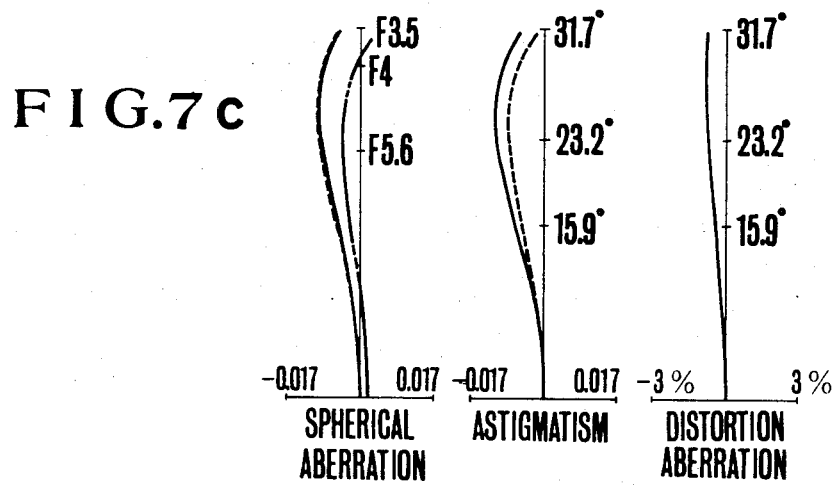

| | Seidel Aberration coefficient | | |
|---|---|---|---|
| | Wide Angle Position f = 1.0 | Intermediate Position f = 1.1667 | Telephoto Position f = 1.4774 |
| $\dot{IV}$ | −0.54699 | −0.44821 | −0.40812 |
| $\dot{V}$ | −1.17295 | −0.65876 | −0.22918 |
| $II_z^*$ | 0.04636 | 0.05236 | 0.07975 |
| $I_z$ | 0.81416 | 0.70772 | 0.39748 |
| $II_z$ | −0.03390 | −0.03083 | −0.05446 | wherein
I : 3rd-order spherical aberration
II : 3rd-order coma
III : 3rd-order astigmatism
P : 3rd-order petzval sum
V : 3rd-order distortion
Is : Pupil spherical aberration
I* : 5th-order zonal spherical aberration
II* : 5th-order zonal coma
Ihd F : 5th-order oblique meridional spherical aberration
II$_P$ : 5th-order oblique arrowlike coma
$\dot{I}$ : 5th-order oblique spherical aberration
$\dot{II}$ : 5th-order oblique coma
$I\dot{I}I$ : 5th-order oblique astigmatism
$\dot{IV}$ : 5th-order oblique field curvature
$\dot{V}$ : 5th-order oblique distortion
$II_z^*$ : 5th-order additional zonal coma
$I_z$ : 5th-order additional spherical aberration
$II_z$ : 5th-order additional coma FIGS. 6A, 6B and 6C show the second embodiment of a zoom lens according to the present invention in wide angle, intermediate and telephoto settings respectively. FIGS. 7A, 7B and 7C show the aberrations of the zoom lens of FIG. 6 in the wide angle, intermediate and telephoto positions respectively. Numerical data for the second embodiment are given below.

| EMBODIMENT II | | | | |
|---|---|---|---|---|
| f = 1.0~1.4774 ω = 43°~31.7° F. No. = 3.5 | | | | |
| Surface No. | R | D | N | ν |
| First component | 1 | 3.31247 (Aspheric) | 0.10334 | 1.62299 | 58.2 |
| | 2 | 1.01729 | 0.53234 | | |
| | 3 | 2.85951 | 0.12401 | 1.64769 | 33.8 |
| | 4 | 5.63059 | 0.02067 | | |
| | 5 | 5.71514 | 0.07440 | 1.62299 | 58.2 |
| | 6 | 0.91837 | 0.19381 | | |
| | 7 | 1.01447 | 0.16948 | 1.74400 | 44.8 |
| | 8 | 1.77327 | Variable | | |
| Second Component | 9 | 2.23411 | 0.09218 | 1.60311 | 60.7 |
| | 10 | 19.2399 | 0.01240 | | |
| | 11 | 1.34674 | 0.11161 | 1.60311 | 60.7 |
| | 12 | 6.43840 | 0.17223 | | |
| | 13 | Aperture | 0.11901 | | |
| | 14 | 2.51286 | 0.13173 | 1.60311 | 60.7 |
| | 15 | −2.15943 | 0.07998 | | |
| | 16 | 0.84421 | 0.11574 | 1.62007 | 36.3 |
| | 17 | 1.54786 | 0.06452 | | |
| | 18 | −2.52170 | 0.04134 | 1.80518 | 25.4 |
| | 19 | 6.03440 | 0.12401 | 1.71300 | 53.9 |
| | 20 | −0.91660 | 0.02067 | | |
| | 21 | −5.97822 | 0.10334 | 1.7725 | 49.7 |
| | 22 | −1.61916 | | | |

Lens Separation during Zooming with object at infinite

| f | 1.0 | 1.1574 | 1.4774 |
|---|---|---|---|
| $D_8$ | 0.84564 | 0.4872 | 0.0214 |

Figuring constants for aspheric surface $R_1$:

$B_1 = 2.9469 \times 10^{-2}$ $C_1 = 1.3667 \times 10^{-3}$
$D_1 = -4.2675 \times 10^{-5}$ $E_1 = 8.3883 \times 10^{-4}$ Values of conditions (1) to (5)

$$\frac{f_1}{f_w} = -1.8774 \quad (1)$$

$$\frac{l_w}{f_w} = 0.8456 \quad (2)$$

$$\left| \frac{L_{T1}}{\bar{h}_{w1}} \right| = \frac{-0.62521}{-1.1777} = 0.5309 \quad (3)$$

$$\left| \frac{\bar{h}_w}{h_w} \right| = 1.1777 \quad (4)$$

$$\psi_1 = 0.1469 \quad (5)$$

| | Ray Tracing Result in Wide Angle Position | | | |
|---|---|---|---|---|
| Surface No. | α | h | $\bar{\alpha}$ | $\bar{h}$ |
| First component | 1 | 0.000000 | 1.000000 | −1.000000 | −1.177701 |
| | 2 | 0.188076 | 0.988025 | −1.221497 | −1.099926 |
| | 3 | −0.416996 | 1.210007 | −0.547897 | −0.808260 |
| | 4 | −0.142923 | 1.220764 | −0.730972 | −0.753246 |
| | 5 | −0.283349 | 1.226620 | −0.644325 | −0.739929 |
| | 6 | −0.149639 | 1.233480 | −0.724982 | −0.706693 |
| | 7 | −0.986398 | 1.424651 | −0.245581 | −0.659098 |
| | 8 | 0.058433 | 1.418973 | −0.728960 | −0.588260 |
| | 9 | −0.536920 | 1.876148 | −0.482146 | −0.177724 |
| Second component | 10 | −0.030441 | 1.877898 | −0.530123 | −0.147242 |
| | 11 | −0.089307 | 1.879006 | −0.525508 | −0.140725 |
| | 12 | 0.752172 | 1.826641 | −0.588529 | −0.099753 |
| | 13 | 0.581062 | 1.726565 | −0.579185 | 0.000000 |
| | 14 | 0.581062 | 1.657411 | −0.579185 | 0.068931 |
| | 15 | 0.978859 | 1.576977 | −0.562641 | 0.115164 |
| | 16 | 1.419298 | 1.463461 | −0.530476 | 0.157591 |
| | 17 | 0.344428 | 1.438854 | −0.646222 | 0.203759 |
| | 18 | −0.231953 | 1.453819 | −0.727845 | 0.250717 |
| | 19 | −0.696161 | 1.469760 | −0.807900 | 0.269217 |
| | 20 | −0.718613 | 1.521782 | −0.812012 | 0.328000 |
| | 21 | 0.465149 | 1.512168 | −0.556868 | 0.339509 |
| | 22 | 0.261248 | 1.497220 | −0.602647 | 0.373991 |
| | 23 | 1.000000 | | −0.418114 | |

| | Ray Tracing Result in Telephoto Position | | | |
|---|---|---|---|---|
| Surface No. | α | h | $\bar{\alpha}$ | $\bar{h}$ |
| First component | 1 | 0.000000 | 1.477433 | −0.676849 | −0.625208 |
| | 2 | 0.277869 | 1.459741 | −0.794436 | −0.574624 |
| | 3 | −0.616084 | 1.787705 | −0.442533 | −0.339048 |
| | 4 | −0.211159 | 1.803598 | −0.519329 | −0.299901 |
| | 5 | −0.418629 | 1.812250 | −0.484824 | −0.289942 |
| | 6 | −0.221082 | 1.8223385 | −0.516429 | −0.266267 |
| | 7 | −1.457338 | 2.104827 | −0.255801 | −0.201186 |
| | 8 | 0.086330 | 2.096437 | −0.483350 | −0.154216 |

-continued

| | Ray Tracing Result in Telephoto Position | | | |
|---|---|---|---|---|
| Surface No. | $a$ | $h$ | $\bar{a}$ | $\bar{h}$ |
| | 9 | −0.793264 | 2.096245 | −0.418646 | −0.154318 |
| | 10 | −0.227368 | 2.109318 | −0.460306 | −0.127850 |
| | 11 | −0.293488 | 2.112958 | −0.456298 | −0.122192 |
| | 12 | 0.652761 | 2.067513 | −0.511019 | −0.086615 |
| | 13 | 0.459088 | 1.988445 | −0.502906 | 0.000000 |
| | 14 | 0.459088 | 1.933808 | −0.502906 | 0.059853 |
| Second | 15 | 0.923223 | 1.857945 | −0.4885540 | 0.099996 |
| component | 16 | 1.442135 | 1.742603 | −0.460612 | 0.136836 |
| | 17 | 0.162243 | 1.731012 | −0.561114 | 0.176924 |
| | 18 | −0.531171 | 1.765281 | −0.631987 | 0.217698 |
| | 19 | −1.094830 | 1.790351 | −0.701498 | 0.233761 |
| | 20 | −1.122179 | 1.871588 | −0.705069 | 0.284802 |
| | 21 | 0.333690 | 1.864691 | −0.482528 | 0.294795 |
| | 22 | 0.082254 | 1.859985 | −0.523278 | 0.324736 |
| | 23 | 1.000000 | | −0.363048 | |

| | Seidel Aberration Coefficient | | |
|---|---|---|---|
| | Wide Angle Position $f = 1.0$ | Intermediate Position $f = 1.157$ | Telephoto Position $f = 1.4774$ |
| L | 0.002391 | 0.000981 | −0.003217 |
| T | 0.001541 | 0.001234 | 0.000591 |
| I | 1.28698 | 1.60834 | 2.50436 |
| II | 0.06718 | 0.07779 | 0.09026 |
| III | 0.01154 | 0.00746 | 0.00349 |
| P | 0.09922 | 0.09922 | 0.09922 |
| V | 0.22617 | 0.14369 | 0.05496 |
| *I | −198.22212 | −235.53613 | −228.00417 |
| *II | −19.42143 | −20.09659 | −0.70993 |
| $I_F$ | −2.34416 | −2.72906 | −0.70238 |
| $II_P$ | 0.40295 | 0.30382 | 0.20748 |
| $\hat{I}$ | −7.96138 | −9.18789 | −9.55453 |
| $\hat{II}$ | 0.24723 | −0.09706 | −0.58069 |
| $\hat{III}$ | 0.08471 | 0.09842 | −0.00792 |
| $\hat{IV}$ | −0.59781 | −0.47166 | −0.4698 |
| $\hat{V}$ | −1.14556 | −0.64693 | −0.22456 |
| *$II_Z$ | 0.10701 | 0.14767 | 0.24728 |
| $I_Z$ | 0.89580 | 0.87407 | 0.77858 |
| $II_Z$ | 0.11751 | 0.10953 | 0.08368 |

Figure 9A:
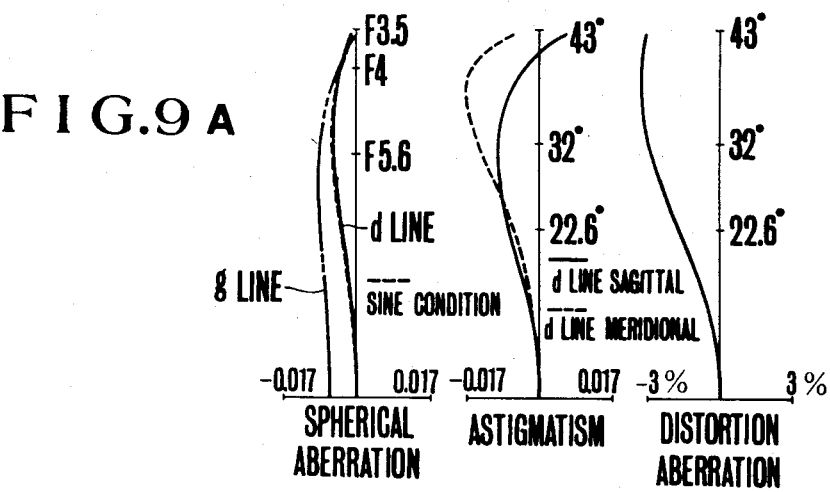
FIGS. 9A, 9B and 9C are graphic representations showing various aberrations of FIG. 8 embodiment when set in the wide angle, intermediate and telephoto positions respectively.
Figure 9B:
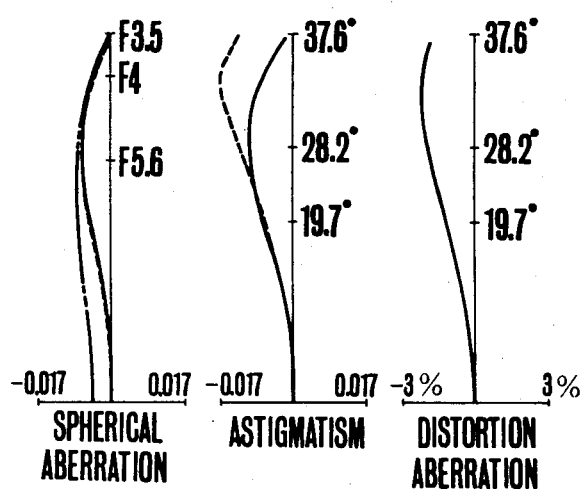
Figure 9C:
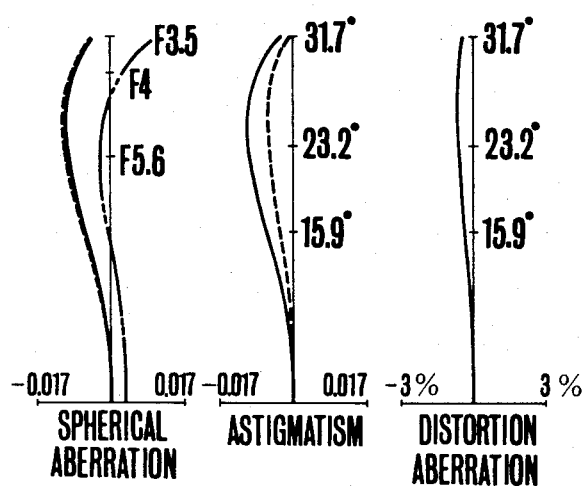

FIGS. 8A, 8B and 8C show the third embodiment of a zoom lens according to the present invention in wide angle, intermediate and telephoto setting respectively. FIGS. 9A, 9B and 9C show the aberrations of the zoom lens of FIG. 8 in in the wide angle, intermediate and telephoto positions respectively. Numerical data for the third embodiment are given below:

| | EMBODIMENT III | | | |
|---|---|---|---|---|
| | $f = 1.0 - 1.5009$ $\omega = 43°$-$31.7°$ F.—No = 3.5 | | | |
| Surface No. | R | D | N | $\nu$ |
| | 1 | 3.10519 | 0.08333 | 1.63930 | 44.90 |
| | | (Aspheric) | | | |
| | 2 | 0.99343 | 0.49575 | | |
| | 3 | −27.08355 | 0.22084 | 1.69896 | 30.10 |
| | 4 | −6.45838 | 0.01667 | | |
| First | 5 | 24.88625 | 0.08333 | 1.62606 | 39.10 |
| Component | 6 | 1.23685 | 0.17340 | | |
| | 7 | 1.45044 | 0.08805 | 1.67000 | 57.40 |
| | 8 | 0.94600 | 0.02791 | | |
| | 9 | 0.95138 | 0.29771 | 1.72342 | 38.00 |
| | 10 | 3.04656 | Variable | | |

-continued

| | EMBODIMENT III | | | |
|---|---|---|---|---|
| | $f = 1.0 - 1.5009$ $\omega = 43°$-$31.7°$ F.—No = 3.5 | | | |
| Surface No. | R | D | N | $\nu$ |
| | 11 | 1.05238 | 0.14826 | 1.60717 | 40.30 |
| | 12 | −118.71302 | 0.14014 | | |
| | 13 | Aperture | 0.03642 | | |
| | 14 | 1.78737 | 0.10159 | 1.60738 | 56.80 |
| | 15 | 5.70494 | 0.06198 | | |
| | 16 | 1.96287 | 0.07715 | 1.62299 | 58.20 |
| Second | 17 | 12.42392 | 0.08463 | | |
| component | 18 | −0.97642 | 0.13333 | 1.80518 | 25.40 |
| | 19 | 1.52402 | 0.05417 | | |
| | 20 | −2.65938 | 0.11667 | 1.72000 | 50.20 |
| | 21 | −0.91615 | 0.02917 | | |
| | 22 | −7.67927 | 0.10417 | 1.77250 | 49.70 |
| | 23 | −1.45012 | 0.00431 | | |

Lens Separation during Zooming with object at infinity

| f | 1.0 | 1.1714 | 1.5009 |
|---|---|---|---|
| $D_{10}$ | 0.8838 | 0.4980 | 0.02 |

Figuring constants for aspheric surface $R_1$:

$B_1 = 2.5151 \times 10^{-2}$
$C_1 = 2.6680 \times 10^{-3}$
$D_1 = 6.3508 \times 10^{-5}$
$E_1 = 4.2858 \times 10^{-4}$ Values of conditions (1) to (5)

$$\frac{f_1}{fW} = -1.8750 \tag{1}$$

$$\frac{lW}{fW} = 0.8838 \tag{2}$$

$$\left|\frac{\bar{h}_{T1}}{\bar{h}_{W1}}\right| = \frac{-0.5980}{-1.1493} = 0.5203 \tag{3}$$

$$\left|\frac{h_{W1}}{\bar{h}_{W1}}\right| = 0\ 1.1493 \tag{4}$$

$$\phi_1 = 0.1286 \tag{5}$$

| | Ray Tracing Result in Wide Angle Position | | | |
|---|---|---|---|---|
| Surface No. | $a$ | $h$ | $\bar{a}$ | $\bar{h}$ |
| | 1 | 0.000000 | 1.000000 | −1.000000 | −1.149344 |
| | 2 | 0.206670 | 0.9898534 | −1.237535 | −1.086674 |
| | 3 | −0.432561 | 1.203156 | −0.535553 | −0.822189 |
| | 4 | −0.463730 | 1.263203 | −0.514253 | −0.755600 |
| First | 5 | −0.326498 | 1.268624 | −0.596340 | −0.745699 |
| component | 6 | −0.294461 | 1.283657 | −0.615171 | −0.714292 |
| | 7 | −0.946702 | 1.447186 | −0.252231 | −0.670723 |
| | 8 | −0.275642 | 1.461663 | −0.563245 | −0.641140 |
| | 9 | −1.314820 | 1.498218 | −0.107423 | −0.638154 |
| | 10 | −0.171299 | 1.527684 | −0.594526 | −0.535845 |

-continued

Ray Tracing Result in Wide Angle Position

| | Surface No. | α | h | ā | h̄ |
|---|---|---|---|---|---|
| Second component | 11 | −0.535375 | 1.999042 | −0.466800 | −0.124861 |
| | 12 | 0.622386 | 1.941847 | −0.539114 | −0.075319 |
| | 13 | 0.632356 | 1.853565 | −0.539501 | 0.000000 |
| | 14 | 0.632356 | 1.830624 | −0.539501 | 0.019572 |
| | 15 | 1.256817 | 1.751495 | −0.532825 | 0.053119 |
| | 16 | 1.069629 | 1.685453 | −0.538502 | 0.086367 |
| | 17 | 1.606619 | 1.609372 | −0.510985 | 0.110565 |
| | 18 | 1.525608 | 1.480759 | −0.516550 | 0.154111 |
| | 19 | 0.299855 | 1.458696 | −0.644122 | 0.201506 |
| | 20 | −0.473765 | 1.484260 | −0.750990 | 0.242030 |
| | 21 | −0.877153 | 1.543530 | −0.816769 | 0.297220 |
| | 22 | 0.340564 | 1.533635 | −0.582287 | 0.314038 |
| | 23 | 0.185696 | 1.522764 | −0.614009 | 0.350085 |
| | | | 1.000000 | −0.426799 | |

Ray Tracing Result in Telephoto Position

| | Surface No. | α | h | ā | h̄ |
|---|---|---|---|---|---|
| First component | 1 | 0.000000 | 1.500925 | −0.666256 | −0.598007 |
| | 2 | 0.310196 | 1.485216 | −0.789846 | −0.558008 |
| | 3 | −0.649241 | 1.805846 | −0.429377 | −0.345959 |
| | 4 | −0.696024 | 1.895973 | −0.424015 | −0.291521 |
| | 5 | −0.490048 | 1.904109 | −0.452085 | −0.284015 |
| | 6 | −0.441964 | 1.926673 | −0.459257 | −0.260568 |
| | 7 | −1.420928 | 2.172117 | −0.326860 | −0.204108 |
| | 8 | −0.413718 | 2.193846 | −0.421504 | −0.181970 |
| | 9 | −1.973447 | 2.248712 | −0.292132 | −0.173848 |
| | 10 | −0.257002 | 2.292938 | −0.424830 | −0.100741 |
| Second component | 11 | −0.803557 | 2.279965 | −.400817 | −0.107212 |
| | 12 | 0.516903 | 2.232464 | −0.462910 | −0.064672 |
| | 13 | 0.528365 | 2.158700 | −0.463242 | 0.000000 |
| | 14 | 0.528365 | 2.139532 | −0.463242 | 0.016805 |
| | 15 | 1.258200 | 2.060315 | −0.457509 | 0.045610 |
| | 16 | 1.038007 | 1.996226 | −0.462384 | 0.074159 |
| | 17 | 1.675009 | 1.916953 | −0.438756 | 0.094936 |
| | 18 | 1.577517 | 1.783965 | −0.443535 | 0.132328 |
| | 19 | 0.100774 | 1.776550 | −0.553074 | 0.173023 |
| | 20 | −0.841420 | 1.821953 | −0.644837 | 0.207819 |
| | 21 | −1.336585 | 1.912267 | '0.701317 | 0.255207 |
| | 22 | 0.172034 | 1.907269 | −0.499980 | 0.269735 |
| | 23 | −0.020563 | 1.908473 | −0.527218 | 0.300600 |
| | | | 1.000000 | −0.366471 | |

Seidel Aberration Coefficient

| | Wide Angle Position (f = 1.0) | Intermediate Position (f = 1.1714) | Telephoto Position (f = 1.5009) |
|---|---|---|---|
| L | 0.004090 | 0.000920 | −0.006976 |
| T | 0.001507 | 0.000863 | −0.000244 |
| I | 1.53799 | 1.93858 | 2.77450 |
| II | 0.09306 | 0.10098 | 0.09006 |
| III | −0.00952 | −0.01050 | −0.01188 |
| P | 0.10789 | 0.10789 | 0.10789 |
| V | 0.22211 | 0.12621 | 0.04477 |
| *I | −226.49796 | −285.36145 | −314.07371 |
| *II | −21.09109 | −22.58253 | −4.88570 |
| $I_F$ | −2.52705 | −2.84819 | −0.65751 |
| $II_P$ | 0.35341 | 0.35549 | 0.44224 |
| Î | −8.28476 | −9.67257 | −10.02475 |
| İİ | −0.15251 | −0.42040 | −0.66159 |
| IIĨ | 0.18372 | 0.14398 | 0.03984 |
| ÎV | −0.52263 | −0.44332 | −0.42212 |
| V̂ | −1.11592 | −0.55675 | −0.19586 |
| *$II_z$ | 0.21254 | 0.27025 | 0.38149 |
| $I_z$ | 1.11874 | 1.06776 | 0.90757 |
| $II_z$ | 0.15352 | 0.13128 | 0.07997 |

Figure 11:
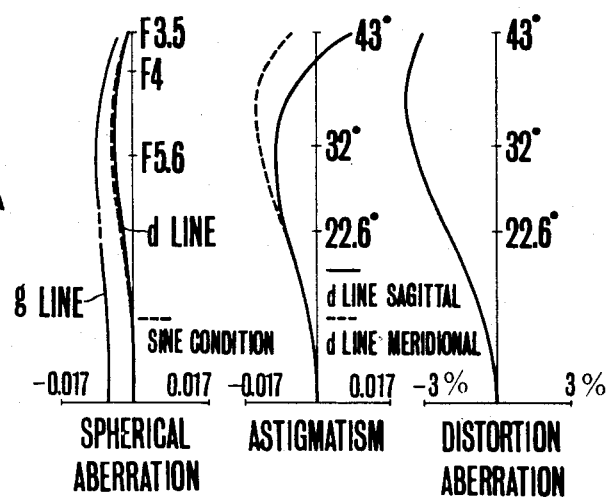
FIGS. 11A, 11B and 11C are graphic representations showing various aberrations of FIG. 10 embodiment when set in the wide angle, intermediate and telephoto positions respectively.
Figure 11:
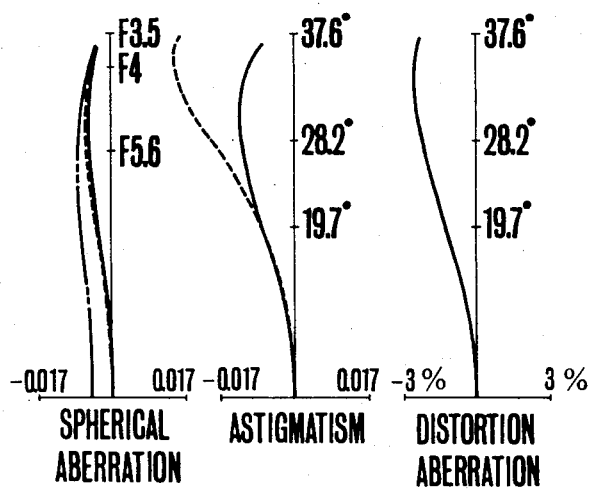
Figure 11:
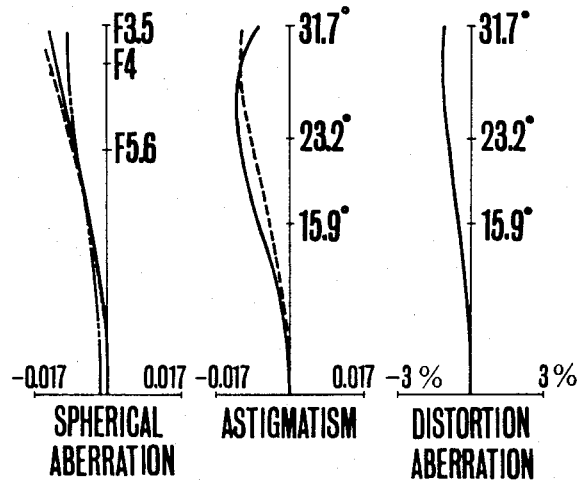

FIGS. 10A, 10B and 10C show the fourth embodiment of a zoom lens according to the present invention in wide angle, intermediate and telephoto settings, respectively. FIGS. 11A 11B and 11C show the aberration of the zoom lens of FIG. 10 in the wide angle, intermediate and telephoto positions respectively. Numerical data for the fourth embodiment are given below:

EMBODIMENT IV f = 1.0 ~ 1.4999  ω = 43° ~ 31.3°  F.—No. = 3.5

| | Surface No. | R | D | N | ν |
|---|---|---|---|---|---|
| First compnent | 1 | 2.5307 | 0.0958 | 1:62299 | 58.2 |
| | 2 | 1.2617 | 0.4694 | | |
| | Apheric | | | | |
| | 3 | 9.2714 | 0.2306 | 1.64769 | 33.8 |
| | 4 | −5.5741 | 0.0004 | | |
| | 5 | 8.9772 | 0.0898 | 1.60311 | 60.7 |
| | 6 | 0.8739 | 0.4139 | | |
| | 7 | 0.8680 | 0.0803 | 1.74400 | 44.8 |
| | 8 | 1.0190 | Variable | | |
| Second component | 9 | 2.3236 | 0.0762 | 1.60311 | 60.7 |
| | 10 | −432.0417 | 0.0125 | | |
| | 11 | 1.4579 | 0.1196 | 1.60311 | 60.7 |
| | 12 | 9.1496 | 0.1455 | | |
| | 13 | Aperture | 0.1253 | | |
| | 14 | 3.1281 | 0.1419 | 1.60311 | 60.7 |
| | 15 | −2.0915 | 0.0724 | | |
| | 16 | −0.8838 | 0.1321 | 1.62004 | 36.3 |
| | 17 | 1.5065 | 0.0777 | | |
| | 18 | −3.3357 | 0.0417 | 1.80518 | 25.4 |
| | 19 | 6.3005 | 0.1441 | 1.71300 | 53.9 |
| | 20 | −0.9613 | 0.0083 | | |
| | 21 | −5.5970 | 0.1364 | 1.80610 | 40.9 |
| | 22 | −1.7636 | | | |

Lens Separation during Zooming with object at infinity

| f | 1.0 | 1.1667 | 1.4999 |
|---|---|---|---|
| $D_8$ | 0.9360 | 0.5502 | 0.0360 |

Figuring constants for aspheric surface $R_2$:

$B_2 = 3.7518 \times 10^{-3}$ $C_2 = -8.6396 \times 10^{-4}$ $D_2 = 0.$ $E_2 = 0.$ Values of conditions (1) to (5)

$$\frac{f_1}{fW} = -1.8750 \quad (1)$$

$$\frac{lW}{fW} = 0.9360 \quad (2)$$

$$\left|\frac{\bar{h}_{T2}}{\bar{h}_{W2}}\right| = \frac{-0.6820}{-1.29193} = 0.5279 \quad (3)$$

$$\left|\frac{\bar{h}_{W2}}{h_{W2}}\right| = \frac{-1.29193}{0.98546} = 1.3110 \quad (4)$$

$$\psi_2 = 0.0187 \quad (5)$$

Ray Tracing Result in Wide Angle Position

| | Surface No. | $\alpha$ | h | $\bar{\alpha}$ | $\bar{h}$ |
|---|---|---|---|---|---|
| First component | 1 | 0.000000 | 1.000000 | −1.000000 | −1.370906 |
| | 2 | 0.246164 | 0.985464 | −1.337467 | −1.291931 |
| | 3 | −0.240410 | 1.098307 | −0.699575 | −0.963568 |
| | 4 | −0.163685 | 1.121217 | −0.766888 | −0.856231 |
| | 5 | −0.033405 | 1.121217 | −0.866378 | −0.856230 |
| | 6 | 0.041919 | 1.118868 | −0.923900 | −0.804466 |
| | 7 | −0.730218 | 1.421076 | −0.368734 | −0.651812 |
| | 8 | 0.487860 | 1.398617 | −0.927479 | −0.609165 |
| Second component | 9 | −0.533322 | 1.897798 | −0.482705 | −0.157361 |
| | 10 | −0.040752 | 1.899735 | −0.523547 | −0.132479 |
| | 11 | −0.038100 | 1.900211 | −0.523732 | −0.125932 |
| | 12 | 0.747945 | 1.844403 | −0.575826 | −0.082967 |
| | 13 | 0.626371 | 1.753288 | −0.570357 | −0.000000 |
| | 14 | 0.626371 | 1.674805 | −0.570357 | 0.071465 |
| | 15 | 0.949277 | 1.590784 | −0.556578 | 0.120728 |
| | 16 | 1.407982 | 1.488851 | −0.521766 | 0.158502 |
| | 17 | 0.363432 | 1.459216 | −0.632968 | 0.210115 |
| | 18 | −0.237145 | 1.477638 | −0.719446 | 0.266003 |
| | 19 | −0.593819 | 1.491345 | −0.783654 | 0.284091 |
| | 20 | −0.615638 | 1.543148 | −0.787811 | 0.350382 |
| | 21 | 0.528930 | 1.538740 | −0.527929 | 0.354781 |
| | 22 | 0.307321 | 1.515527 | −0.579025 | 0.398518 |
| | | 1.000000 | | −0.396880 | |

Ray Tracing Result in Telephoto Position

| | Surface No. | $\alpha$ | h | $\bar{\alpha}$ | $\bar{h}$ |
|---|---|---|---|---|---|
| First component | 1 | 0.000000 | 1.499919 | −0.666703 | −0.732011 |
| | 2 | 0.369226 | 1.478117 | −0.846897 | −0.682002 |
| | 3 | −0.360596 | 1.647371 | −0.510158 | −0.442548 |
| | 4 | −0.245514 | 1.681734 | −0.541073 | −0.366817 |
| | 5 | −0.050105 | 1.681734 | −0.583695 | −0.366816 |
| | 6 | 0.062876 | 1.678211 | −0.608339 | −0.332732 |
| | 7 | −1.095268 | 2.131498 | −0.378718 | −0.175996 |
| | 8 | 0.731750 | 2.097812 | −0.529574 | −0.151617 |
| | 9 | −0.799940 | 2.126582 | −0.418873 | −0.136552 |

-continued

Ray Tracing Result in Wide Angle Position

| | Surface No. | $\alpha$ | h | $\bar{\alpha}$ | $\bar{h}$ |
|---|---|---|---|---|---|
| Second component | 10 | −0.247989 | 2.138368 | −0.454314 | −0.114960 |
| | 11 | −0.245004 | 2.141431 | −0.454475 | −0.109279 |
| | 12 | 0.640825 | 2.093615 | −0.499679 | −0.071995 |
| | 13 | 0.502824 | 2.020472 | −0.494934 | −0.000000 |
| | 14 | 0.502824 | 1.957469 | −0.494934 | 0.062014 |
| | 15 | 0.880227 | 1.879560 | −0.482977 | 0.104763 |
| | 16 | 1.422202 | 1.776598 | −0.452769 | 0.137542 |
| | 17 | 0.175774 | 1.762265 | −0.549265 | 0.182329 |
| | 18 | −0.549530 | 1.804953 | −0.624308 | 0.230827 |
| | 19 | −0.985212 | 1.827694 | −0.680025 | 0.246523 |
| | 20 | −1.011952 | 1.912846 | −0.683632 | 0.304048 |
| | 21 | 0.406825 | 1.909455 | −0.458116 | 0.307866 |
| | 22 | 0.131825 | 1.899498 | −0.502455 | 0.345818 |
| | | 1.000000 | | −0.344397 | |

Seidel Aberration Coefficient

| | Wide Angle position (f = 1) | Intermediate position (f = 1.1667) | Telephoto position (f = 1.4999) |
|---|---|---|---|
| L | 0.005299 | 0.000868 | 0.004074 |
| T | 0.002686 | 0.001527 | 0.002262 |
| I | 1.25909 | 1.79741 | 1.49914 |
| II | 0.11936 | 0.07240 | 0.12070 |
| III | −0.01383 | −0.01457 | −0.01209 |
| P | 0.10520 | 0.10520 | 0.10520 |
| V | 0.28010 | 0.07101 | 0.16828 |
| I* | −162.18695 | −71.67584 | −183.23573 |
| II* | −22.50484 | −6.94862 | −24.84261 |
| $I_F$ | −1.97978 | −1.96571 | −2.92514 |
| $II_P$ | 0.07557 | 0.10183 | 0.16175 |
| $\hat{I}$ | −7.06887 | −10.12677 | −8.92261 |
| $\hat{II}$ | −0.22532 | −0.65466 | −0.34214 |
| $\hat{III}$ | 0.19255 | 0.02899 | 0.14641 |
| $\hat{IV}$ | −0.49167 | −0.39743 | −0.41004 |
| $\hat{V}$ | −1.43530 | −0.24176 | −0.71003 |
| $II^*_z$ | 0.19579 | 0.25197 | 0.22309 |
| $I_z$ | 0.96620 | 0.76719 | 0.92247 |
| $II_z$ | 0.17894 | 0.06097 | 0.14427 |

Figure 13A:
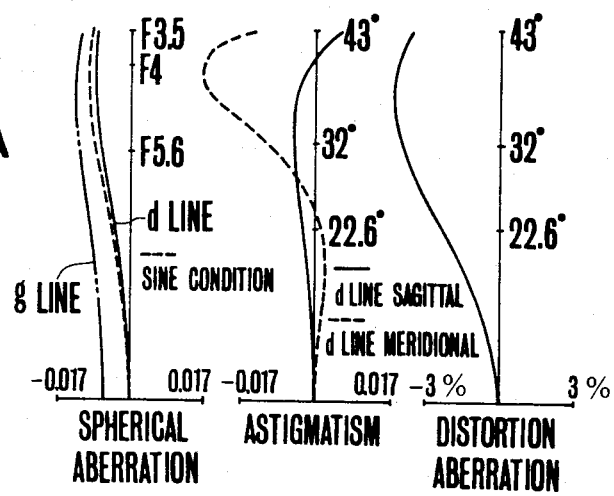
FIGS. 13A, 13B and 13C are graphic representations showing various aberrations of FIG. 12 embodiment when set in the wide angle, intermediate and telephoto positions respectively.
Figure 13B:
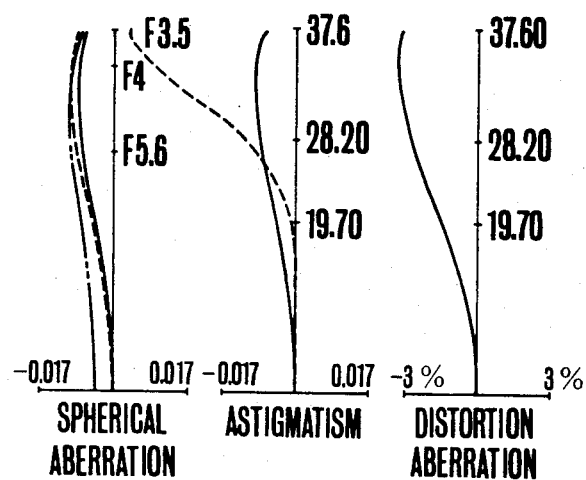
Figure 13C:
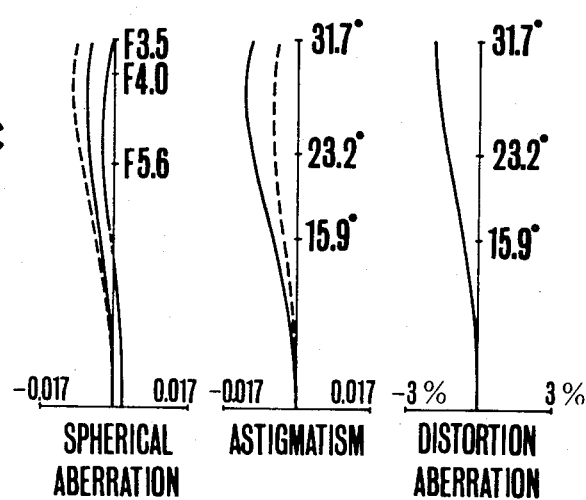

FIGS. 12A, 12B and 12C show the fifth embodiment of a zoom lens according to the present invention in wide angle, intermediate and telephoto settings respectively. FIGS. 13A, 13B and 13C show the aberrations of the zoom lens of FIG. 12 in the wide angle, intermediate and telephoto positions respectively. Numerical data for the fifth embodiment are given below:

EMBODIMENT V f = 1.0 ~ 1.5003  ω = 43° ~ 31.7°  F. No. = 3.5

| | Surface No. | R | D | N | ν |
|---|---|---|---|---|---|
| First component | 1 | 1.9237 | 0.0958 | 1.62299 | 58.2 |
| | 2 | 1.0640 | 0.5038 | | |
| | 3 | 4.8376 | 0.1869 | 1.64769 | 33.8 |
| | 4 | −136.4647 | 0.0002 | | |
| | 5 | 8.1782 Aspheric | 0.0980 | 1.60311 | 60.7 |
| | 6 | 0.8397 | 0.4420 | | |
| | 7 | 1.0032 | 0.1293 | 1.74400 | 44.7 |
| | 8 | 1.2349 | Variable | | |
| Second component | 9 | 2.4038 | 0.0805 | 1.60311 | 60.7 |
| | 10 | 15.9900 | 0.0125 | | |
| | 11 | 1.5231 | 0.2097 | 1.60311 | 60.7 |
| | 12 | 7.7188 | 0.1667 | | |
| | 13 | Aperture | 0.2089 | | |
| | 14 | 2.5992 | 0.1705 | 1.60311 | 60.7 |
| | 15 | −1.5457 | 0.0704 | | |
| | 16 | −0.8976 | 0.1284 | 1.62004 | 36.7 |
| | 17 | 1.6837 | 0.0786 | | |
| | 18 | −5.9445 | 0.0417 | 1.80518 | 25.4 |
| | 19 | 3.9233 | 0.1242 | 1.71300 | 53.9 |
| | 20 | −1.1987 | 0.0083 | | |
| | 21 | −6.8214 | 0.1411 | 1.80610 | 40.9 |
| | 22 | −2.0140 | | | |

Lens Separation during Zooming with object at infinity

| f | 1.0 | 1.1667 | 1.5003 |
|---|---|---|---|
| $D_8$ | 0.8937 | 0.5403 | 0.0687 |

Figuring constants for aspheric surface $R_5$ $B_5 = 3.9117 \times 10^{-2}$ $C_5 = 3.2484 \times 10^{-2}$ $D_5 = 0.$ $E_5 = 0.$ Values of conditions (1) to (5)

$$\frac{f_1}{fW} = -1.6667 \quad (1)$$

$$\frac{lW}{fW} = 0.8937 \quad (2)$$

$$\left| \frac{\bar{h}_{T5}}{\bar{h}_{W5}} \right| = \frac{-0.4066}{-0.8414} = 0.4832 \quad (3)$$

$$\left| \frac{\bar{h}_{W5}}{h_{W5}} \right| = \left| \frac{-0.8418}{1.1189} \right| = 0.7520 \quad (4)$$

$$\psi_5 = 0.1887 \quad (5)$$

Ray Tracing Result in Wide Angle Position

| Surface No. | α | h | $\bar{\alpha}$ | $\bar{h}$ |
|---|---|---|---|---|
| 1 | 0.000000 | 1.000000 | −1.000000 | −1.369988 |
| 2 | 0.323847 | 0.980878 | −1.443667 | −1.284744 |
| 3 | −0.250448 | 1.107052 | −0.691461 | −0.936389 |
| First component 4 | −0.102227 | 1.118647 | −0.816832 | −0.843745 |
| 5 | −0.096918 | 1.118873 | −0.820836 | −0.841833 |
| 6 | −0.014406 | 1.119753 | −0.882918 | −0.787869 |
| 7 | −0.818681 | 1.481598 | −0.317022 | −0.647749 |
| 8 | 0.280150 | 1.460822 | −0.797427 | −0.588612 |
| 9 | −0.600000 | 1.997021 | −0.442787 | −0.192909 |
| 10 | −0.098944 | 2.001991 | −0.491188 | −0.168235 |
| 11 | −0.174455 | 2.004172 | −0.484843 | −0.162174 |
| 12 | 0.619170 | 1.923189 | −0.549061 | −0.090361 |
| 13 | 0.468901 | 1.845015 | −0.542001 | 0.000000 |
| Second component 14 | 0.468901 | 1.747065 | −0.542001 | 0.11329 |
| 15 | 0.874282 | 1.654058 | −0.515730 | 0.168084 |
| 16 | 1.519687 | 1.547067 | −0.450145 | 0.199775 |
| 17 | 0.450952 | 1.511327 | −0.588152 | 0.246389 |
| 18 | −0.105611 | 1.519632 | −0.678888 | 0.299778 |
| 19 | −0.311444 | 1.526821 | −0.719493 | 0.316386 |
| 20 | −0.347317 | 1.552003 | −0.726926 | 0.369090 |
| 21 | −0.575859 | 1.547204 | −0.507381 | 0.373318 |
| 22 | 0.393023 | 1.516496 | −0.551496 | 0.416409 |
|  | 1.000000 |  | −0.384829 |  |

Ray Tracing Result in Telephoto Position

| Surface No. | α | h | $\bar{\alpha}$ | $\bar{h}$ |
|---|---|---|---|---|
| 1 | 0.000000 | 1.500316 | −0.666526 | −0.775060 |
| 2 | 0.485873 | 1.471626 | −0.917528 | −0.720882 |
| 3 | −0.375751 | 1.660928 | −0.495457 | −0.471273 |
| First component 4 | −0.153373 | 1.678323 | −0.558555 | −0.407923 |
| 5 | −0.145408 | 1.678662 | −0.560491 | −0.406617 |
| 6 | −0.021613 | 1.679983 | −0.590477 | −0.370527 |
| 7 | −1.228280 | 2.222866 | −0.324342 | −0.227173 |
| 8 | 0.420313 | 2.191695 | −0.492825 | −0.190625 |
| 9 | −0.900190 | 2.253506 | −0.377973 | −0.164671 |
| 10 | −0.334781 | 2.270323 | −0.419289 | −0.143609 |
| 11 | −0.420413 | 2.275578 | −0.413873 | −0.138436 |
| 12 | 0.480685 | 2.212708 | −0.468691 | −0.077134 |
| 13 | 0.307795 | 2.161393 | −0.462665 | 0.000000 |
| Second component 14 | 0.307795 | 2.097097 | −0.462665 | 0.096647 |
| 15 | 0.794395 | 2.012588 | −0.440239 | 0.143480 |
| 16 | 1.579698 | 1.901372 | −0.384254 | 0.170553 |
| 17 | 0.266203 | 1.880274 | −0.502060 | 0.210323 |
| 18 | −0.426229 | 1.913794 | −0.579514 | 0.255898 |
| 19 | −0.685451 | 1.929616 | −0.614175 | 0.270074 |
| 20 | −0.730788 | 1.982600 | −0.620521 | 0.315064 |
| 21 | 0.448520 | 1.978863 | −0.433112 | 0.318673 |
| 22 | 0.214675 | 1.962089 | −0.470770 | 0.355456 |
|  | 1.000000 |  | −0.328499 |  |

Seidel Aberration Coefficient

|  | Wide Angle position (f = 1) | Intermediate position (f = 1.1667) | Telephoto position (f = 1.5003) |
|---|---|---|---|
| L | 0.005580 | 0.003231 | −0.002822 |
| T | 0.001845 | 0.001303 | 0.000377 |
| I | 1.80427 | 1.94245 | 1.61146 |
| II | 0.15333 | 0.17978 | 0.16626 |
| III | −0.05479 | −0.03494 | −0.01207 |
| P | 0.08713 | 0.08713 | 0.08713 |
| V | 0.31433 | 0.18991 | 0.08215 |
| I* | −154.02337 | −190.01037 | −160.81468 |
| II* | −19.16709 | −20.23031 | −6.79176 |
| $I_F$ | −1.47944 | −1.58998 | −0.21735 |
| $II_P$ | −0.20346 | −0.24810 | −0.34493 |
| Î | −5.95885 | −6.99596 | −7.91963 |
| ÎI | −0.13551 | −0.47661 | −0.87793 |
| ÎII | 0.44525 | 0.21573 | −0.02182 |
| ÎV | −0.02322 | −0.14938 | −0.29231 |
| V̂ | −1.45349 | −0.66207 | −0.20442 |
| $II_z$* | 0.40192 | 0.36963 | 0.23457 |
| $I_z$ | 1.07158 | 0.83300 | 0.19661 |
| $II_z$ | 0.20954 | 0.19678 | 0.12514 |

What is claimed is:

1. A zoom lens comprising, from front to rear in the direction in which light enters said zoom lens from an object, a first lens component having negative focal length and having a plurality of elements moving together during zooming between a wide angle position and a telephoto position, said lens component elements including a front negative meniscus lens which is convex to the front and whose diameter is the longest in said zoom lens, and a rearmost positive lens, one of said lens component elements having an aspherical surface for removing barrel distortion in the wide angle position, said aspherical surface being located to have an aspherical influence on a main light ray off the optical axis in the wide angle position without having an aspherical influence on the main light ray in the telephoto position; and a second lens component of positive focal length having a plurality of elements moving together during zooming between the wide angle and telephoto positions, said second lens component elements including a diaphragm of said zoom lens incorporated therein and including at least one positive lens, one double concave lens and at least one positive lens consecutively arranged on the image side of said diaphragm, said first and said second lens components defining therebetween an air space which is variable and largest at the wide angle position and narrowest in the telephoto position.

2. A zoom lens as described in claim 1, wherein said first lens component further includes a negative lens situated immediately in front of said rearmost positive lens, and said second lens component further includes at least three positive lenses consecutively arranged in the front region thereof.

3. A zoom lens as described in claim 2, characterized by fulfilling the following requirements provided that said non-spherical surface is the i-th surface in said first lens component;

$$-3.0 < \frac{f_1}{f_W} < -1.17 \qquad (1)$$

$$0.54 < \frac{l_W}{f_W} < 1.5 \qquad (2)$$

$$0.35 < \frac{\bar{h}_{Ti}}{\bar{h}_{Wi}} < 0.8 \qquad (3)$$

$$0.7 < \frac{h_{Wi}}{\bar{h}_{Wi}} < 2.0 \qquad (4)$$

$$0 < \psi_i < 0.3 \qquad (5)$$

wherein
- $f_1$: the focal length of the first lens component;
- $f_W$: the focal length of the overall lens system in the wide angle position;
- $l_W$: the axial air separation between the first and second lens component in the wide angle position;
- $h_{Wi}$: the height of the point of incidence of a paraxial ray on the i-th surface (non-spherical) from the optical axis when the zoom lens is in the wide angle setting with object at infinity;
- $\bar{h}_{Wi}$: the height of the point of incidence of a paraxial pupil ray on the i-th surface (non-spherical) from the optical axis when the zoom lens is in the wide angle setting with object at infinity;
- $\bar{h}_{Ti}$: the height of the point of incidence of a paraxial pupil ray on the i-th surface (non-spherical) from the optical axis when the zoom lens is in the telephoto setting with object at infinity;
- $\psi_i$: the non-spherical coefficient for 3rd-order aberration coefficients.

4. A zoom lens as described in claim 3, wherein said rearmost positive lens of said first lens component is a positive meniscus lens convex to the front; and said negative lens of said first lens component is a negative meniscus lens convex to the front.

5. A zoom lens as described in claim 4, wherein said front negative meniscus lens in said first lens component is selected for the provision of said non-spherical surface.

* * * * *